(12) United States Patent  
Weeks

(10) Patent No.: US 6,685,873 B2
(45) Date of Patent: Feb. 3, 2004

(54) METHOD FOR PROGRESSIVELY SEPARATING INTEGRALLY ATTACHED GUTTER FLASH FROM AN IN-MOLD BLOW-MOLDED THERMOPLASTIC RESIN PRODUCT

(76) Inventor: Bruce V. Weeks, 12998 Worthington Rd. NW., Pataskala, OH (US) 43062

( * ) Notice: Subject to any disclaimer, the term of this patent is extended or adjusted under 35 U.S.C. 154(b) by 56 days.

(21) Appl. No.: 09/873,533

(22) Filed: Jun. 4, 2001

(65) Prior Publication Data

US 2002/0180116 A1 Dec. 5, 2002

(51) Int. Cl.<sup>7</sup> ............................................. B29C 45/38
(52) U.S. Cl. .................. 264/536; 264/527; 264/161; 264/163; 425/806; 425/527; 425/537
(58) Field of Search .................. 264/163, 161, 264/527, 536; 425/806, 527, 537

(56) References Cited

U.S. PATENT DOCUMENTS

| 3,172,152 A | | 3/1965 | Uhlig | |
|---|---|---|---|---|
| 3,363,282 A | | 1/1968 | Hagen | |
| 3,713,764 A | * | 1/1973 | Nelson | 425/30 |
| 3,846,531 A | * | 11/1974 | Reilly | 264/161 |
| 3,892,828 A | * | 7/1975 | Weatherly et al. | 264/515 |
| 4,017,243 A | * | 4/1977 | Lindsay | 425/292 |
| 4,381,183 A | | 4/1983 | Bowers et al. | |
| 5,523,047 A | * | 6/1996 | Corby et al. | 264/536 |
| 5,597,524 A | * | 1/1997 | Powell, Jr. | 264/536 |
| 6,360,414 B1 | * | 3/2002 | Maddox et al. | 29/33 A |

OTHER PUBLICATIONS

Weast, Robert C. and Melvin J. Astle, eds. CRC Handbook of Chemistry and Physics. 63rd edition. CRC Press, 1984. pp. D–227, D–228, D–237, E–32, E–33, E–35.*

* cited by examiner

Primary Examiner—Michael Colaianni
Assistant Examiner—Monica A Fontaine

(57) ABSTRACT

A production method is disclosed for separating integrally attached gutter flash from a blow-molded thermoplastic resin product utilizing tensile forces applied to the gutter flash while the product is fully restrained within the closed co-operating product mold in which the product is formed, as well as different embodiments of apparatus suitable for accomplishing the production method in a conventional industrial blow-molding machine.

10 Claims, 22 Drawing Sheets

METHOD FOR PROGRESSIVELY SEPARATING INTEGRALLY ATTACHED GUTTER FLASH FROM AN IN-MOLD BLOW-MOLDED THERMOPLASTIC RESIN PRODUCT

CROSS-REFERENCES

None.

FIELD OF THE INVENTION

The present invention relates generally to the manufacture of blow-molded thermoplastic products, and particularly concerns both a method and apparatus for accomplishing the separation of integrally formed gutter flash from a blow-molded product while the product is completely restrained by the product mold cavity of the apparatus.

BACKGROUND OF THE INVENTION

It is common practice in the United States in connection with the manufacture of blow-molded thermoplastic resin products using conventional production blow-molding machines and known blow-mold assemblies to eject the molded product from the mold assembly with the simultaneously formed gutter flash integrally attached, and to afterwards completely separate the integrally attached flash from the ejected blow-molded product by subsequent combined operations such as sequential cutting and grinding or sequential shearing and grinding. The operating forces required to so-separate and remove such flash, either manually or by machine, sometimes are extremely large and often are beyond the available capacity of the blow-molding machine. The required flash separation and removal forces are especially substantial in cases where the blow-molding machine production cycle unit output is comprised of a single blow-molded product or multiple blow-molded products, each with integrally attached gutter flash, having either or both a substantial resin material wall thickness and a substantial total length of gutter flash trim edge.

In the teachings of U.S. Pat. No. 5,480,607 granted to Hobson a method of separating integrally attached flash from a product during the molding process is disclosed, but such method utilizes a step wherein the flash is temporarily secured to the apparatus blow-mold and the formed product is separated from the restrained integral flash by applying product mold ejector pin forces to the blow-molded product with the mold assembly in a partially open condition. The ejection forces required may be undesirably large and also generally cause ejector pin damage to the formed product in high-rate production cycles wherein the blow-molded product has an elevated temperature and a substantial degree of residual parison plasticity at time of flash separation and product ejection from its mold.

I have discovered a novel method of separating integrally attached gutter flash from a blow-molded product and also novel mold assembly constructions and a methods of assembly operation that may be used in conjunction with use of a conventional production blow-molding machine to achieve complete, or very nearly complete, separation of otherwise integrally attached gutter flash from blow-molded products both while the products are fully restrained by the mold apparatus and prior to product ejection from within the mold apparatus. Subsequently the individual blow-molded thermoplastic resin products and separated gutter flash are ejected from the mold assemblies in which they were formed and removed from the co-operating conventional production blow-molding machine. Because very short blow-molding machine operating cycle unit times may be achieved with the novel in-mold product de-flashing, and because the apparatus takes advantage of separate product and gutter flash removal procedures, the blow-molded thermoplastic resin products and separate gutter flash have no possibility of being inadvertently fused together.

Other objects and advantages of the present invention will become apparent during consideration of the detailed descriptions, drawings, and claims which follow.

SUMMARY OF THE INVENTION

The method of the present invention involves a basic step sequence of blow-molding an extruded and heated thermoplastic resin parison contained within co-operating blow-mold sub-assemblies to form a blow-molded product having integrally attached gutter flash, separating the integrally attached gutter flash from the blow-molded product while the molded product is fully restrained by the mold sub-assemblies and progressively along the product mold parting-line perimeter from one product dimensional limit to an opposite dimensional limit until gutter flash separation from the product is complete, and afterwards opening the closed co-operating mold sub-assemblies for the purpose of removing the product and separated gutter flash from the apparatus. The forces applied to the gutter flash during such progressive gutter flash separation are tension forces rather than otherwise known conventional cutting or shearing forces.

The blow molding apparatus of the present invention is adapted to be readily installed for functioning in a conventional industrial blow-molding system or machine, and basically is comprised of a base blow-mold sub-assembly having one or more product molds, a co-operating cap blow-mold sub-assembly having a corresponding number of product molds complementary to and in registration with the base blow-mold sub-assembly product molds, a pivotally movable gutter plate that surrounds each base blow-mold sub-assembly product mold, a pivotally movable gutter plate that surrounds each cap blow-mold sub-assembly product mold, at least one bi-directional actuator for pivotally moving said base blow-mold sub-assembly gutter plate, at least one bi-directional actuator for pivotally moving said cap blow-mold sub-assembly gutter plate, and a programmable valve sequence control for properly sequentially actuating the different blow-mold sub-assembly actuators throughout the complete production cycle of the blow-molding machine incorporating the apparatus.

DETAILED DESCRIPTION

Figure 1:
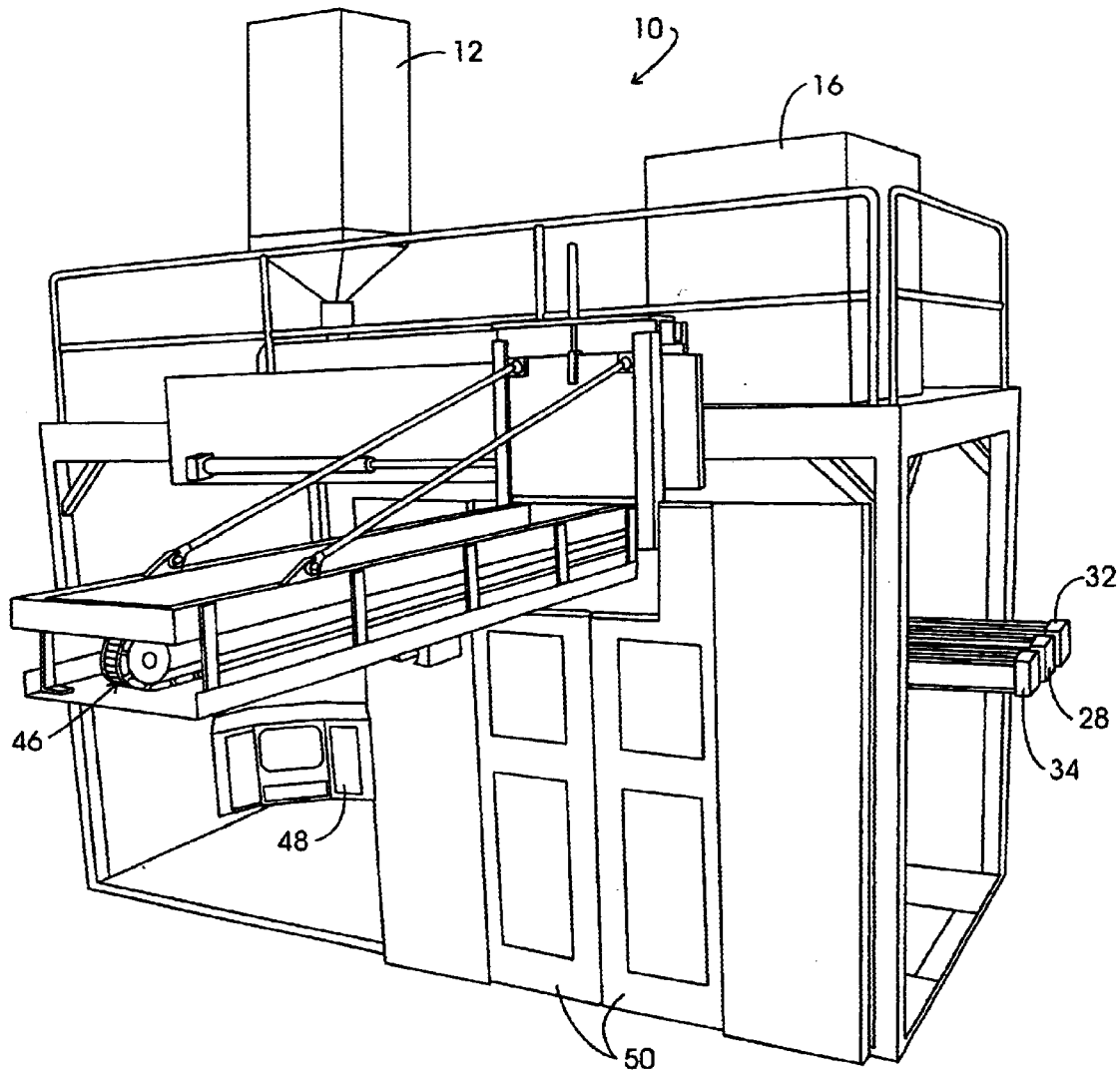
FIG. 1 is a schematic perspective view of a conventional production blow-molding machine within which the methods and apparatus of the present invention may be practiced.
Figure 2:
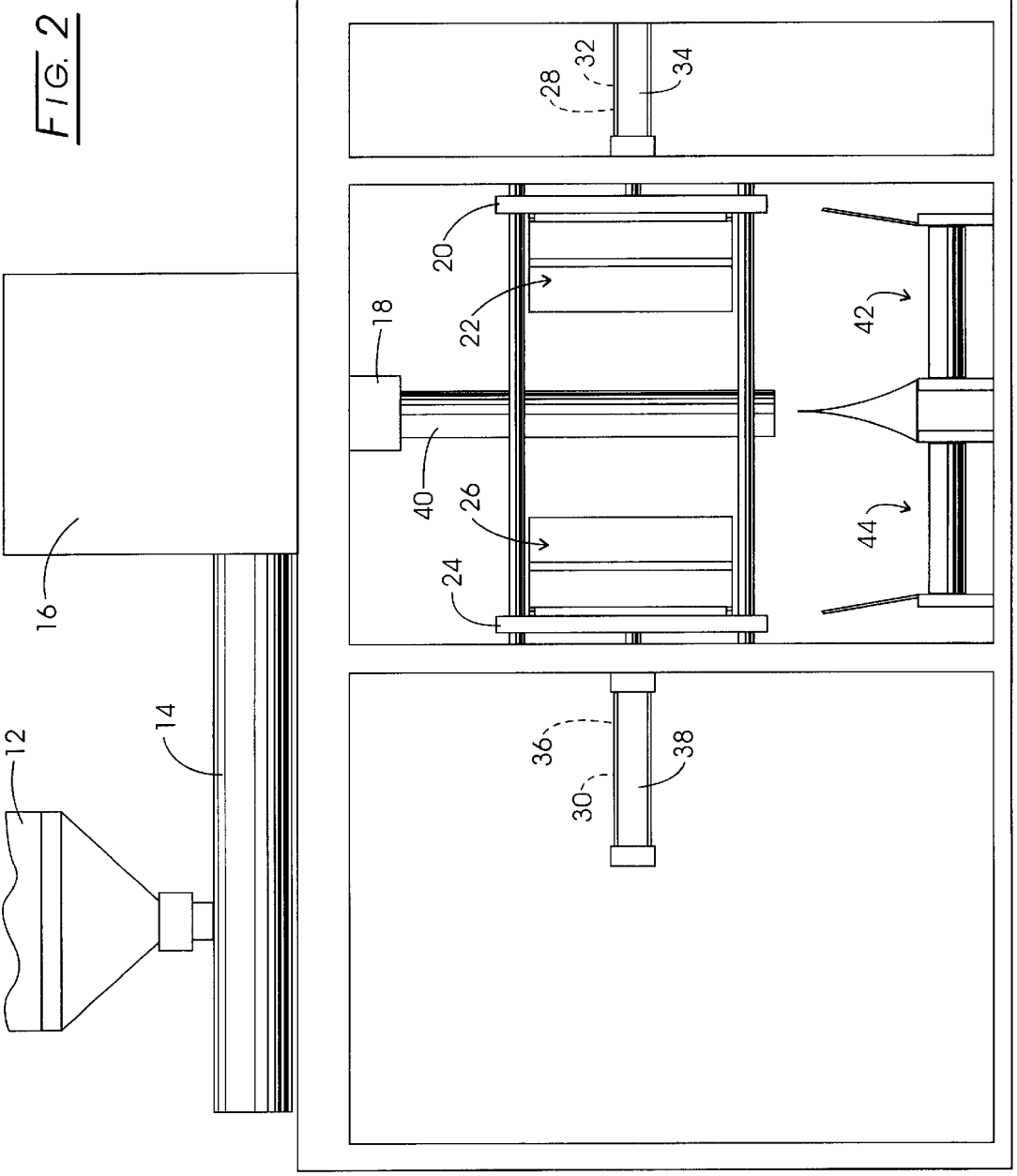
FIG. 2 is a schematic elevation view of the interior of the blow-molding machine of FIG. 1 illustrating the mold sub-assemblies of the present invention in a fully separated condition.
Figure 3:
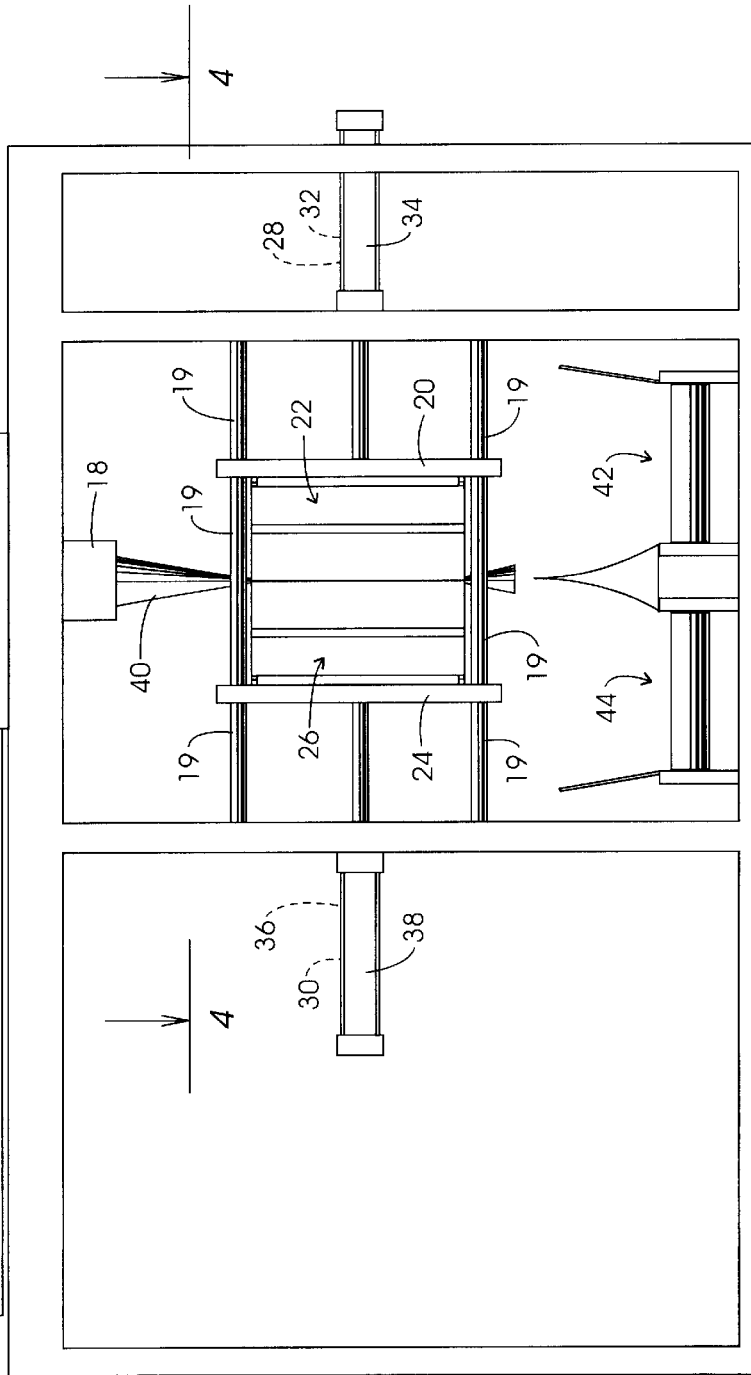
FIG. 3 is similar to FIG. 2 except that the included invention mold sub-assemblies are illustrated in an operationally closed condition.

The method of the present invention involves a basic step sequence of blow-molding an extruded and heated thermoplastic resin parison contained within co-operating blow-mold sub-assemblies to form a blow-molded product with integrally attached gutter flash, separating the integrally attached gutter flash from the blow-molded product progressively along the product mold parting-line perimeter from one product dimensional limit to an opposite dimensional limit until flash separation is, depending essentially on product geometry and overall dimensional size, completed or very-nearly completed, and afterwards separating the closed blow-mold sub-assemblies for purposes of accomplishing removal of the product and separated gutter flash from the blow-mold apparatus. The forces applied to the gutter flash during such progressive gutter flash separation are essentially tension forces rather than conventional cutting or shear forces. One embodiment of the invention apparatus particularly well-suited for the production of multiple units of a relatively small, blow-molded product in one complete operating cycle of a conventional industrial blow-molding machine is detailed in FIGS. 1 through 24 of the drawings. Another embodiment of the apparatus of the present invention, an embodiment particularly well-suited for the production of a single unit of a relatively large, blow-molded product in one complete operating cycle of the conventional industrial blow-molding machine is detailed in FIGS. 25 through 31.

FIGS. 1 through 4 schematically illustrate a conventional industrial blow molding machine 10, such as the large-size either SE or SL Series "Sterling" blow molding system manufactured and marketed by Davis-Standard Corporation of Edison N.J., customized to include the blow-mold assemblies utilized in the practice of the present invention. Such machine generally has a throat size that ranges from 38 inches by 36 inches to 84 inches by 60 inches, and is especially well adapted to the production in each machine cycle of either a single very large blow-molded product or multiple smaller-sized blow-molded products utilizing, in either case, an extremely short production cycle time generally varying from approximately 45 to 60 seconds per cycle. Production rates for machine 10 typically varies in the range from 60 to 480 or more units of blow-molded product per hour, depending upon product dimensional size. Such machine is capable of blow-molding a variety of different thermoplastic resins including polyolefin resins and other resins such as polycarbonate, polyethylene, polyvinylchloride, and like resins that are technically-formulated for use in blow-molding applications.

Machine 10 typically includes the illustrated feedstock hopper 12, a feed screw feedstock conveyor 14, and a conventional melter-accumulator-extruder sub-assembly 16 with variably-controlled parison die head 18. Machine 10 also includes guideposts 19 upon which movable platens 20 and 24 reciprocate. Movable machine platen 20 carries base blow-mold sub-assembly 22 and movable machine platen 24 carries cap blow-mold sub-assembly 26. Although such base and cap blow-mold sub-assemblies have co-operating complementary product-forming cavities and generally similar constructions, their respective total function differs.

Machine platen 20 is powered by bi-directional rapid traverse hydraulic actuator 28 and additionally by bi-directional clamping hydraulic actuators 32 and 34;

machine platen 24 is powered by bi-directional rapid traverse hydraulic actuator 30 and additionally by bi-directional clamping hydraulic actuators 36 and 38. In addition, conventional blow-molding machine 10 typically includes trimmed blow-mold product discharge conveyor 42, flash discharge conveyor 44, and may optionally also include a conventional overhead discharge conveyor 46 (see FIG. 1) normally utilized for removing conventionally formed product units with integrally attached flash from within the machine. Machine 10 typically also includes a operator's control panel or control station 48 and access doors 50 which, when opened, provide access to the interiorly-located invention blow-mold sub-assemblies 22 and 26 for installation and maintenance servicing purposes and the like.

Figure 5:
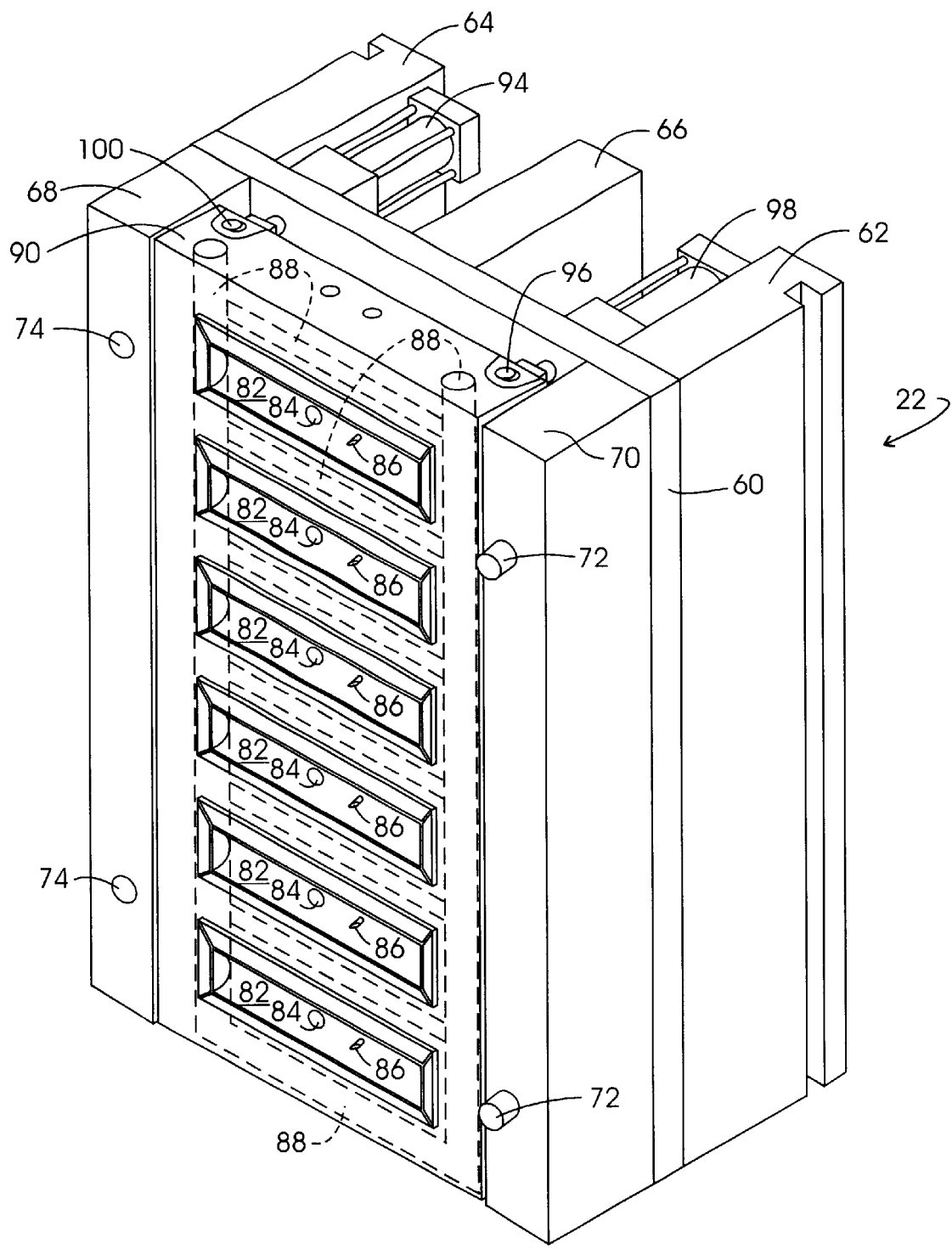
FIG. 5 is an isometric view of one of the invention blow-mold mold sub-assemblies shown in FIGS. 2 through 4.
Figure 6:
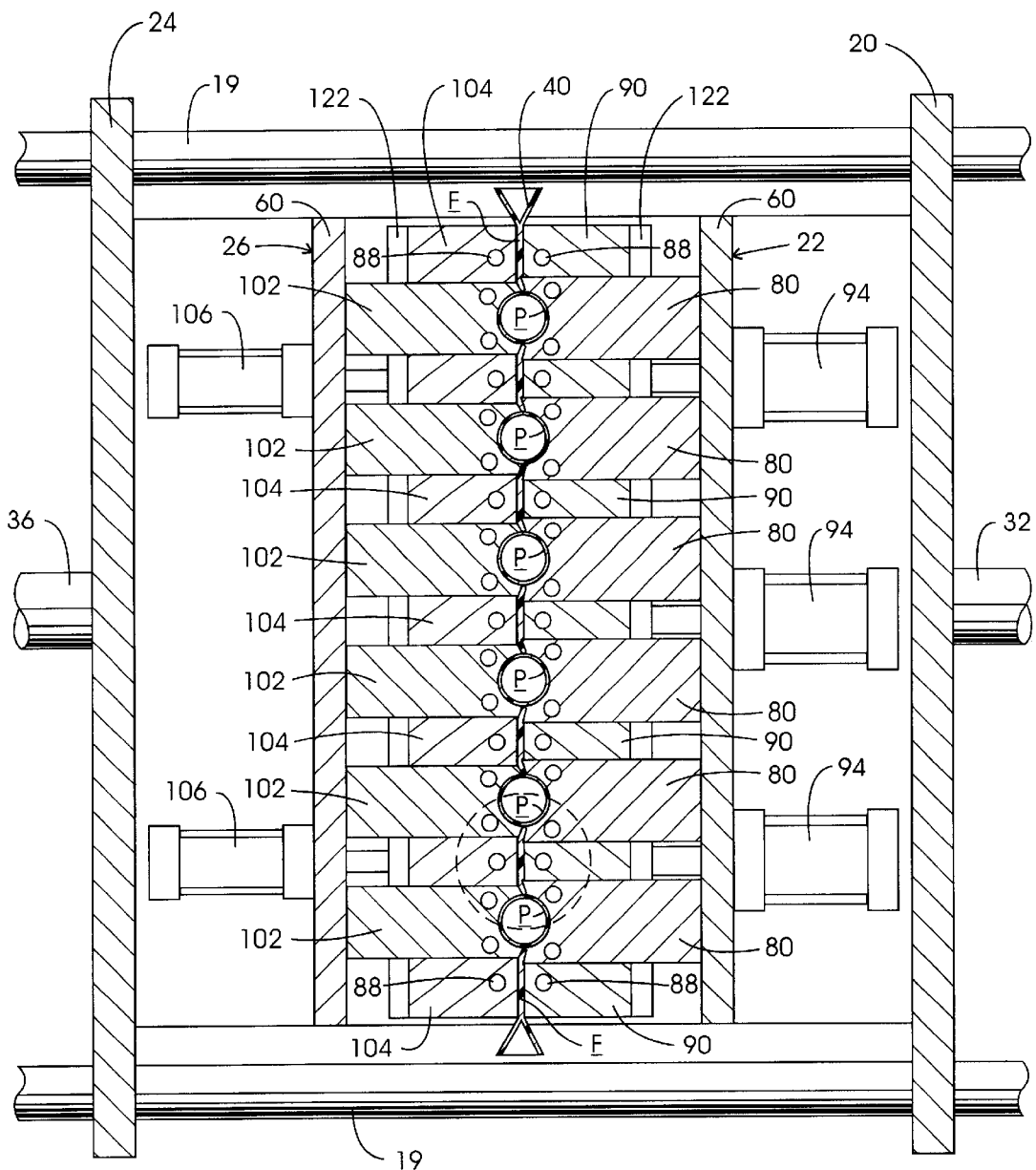
FIG. 6 is an elevation section view taken at line 6—6 of FIG. 4 at completion of an in-mold intermediate product blow-forming step.
Figure 7:
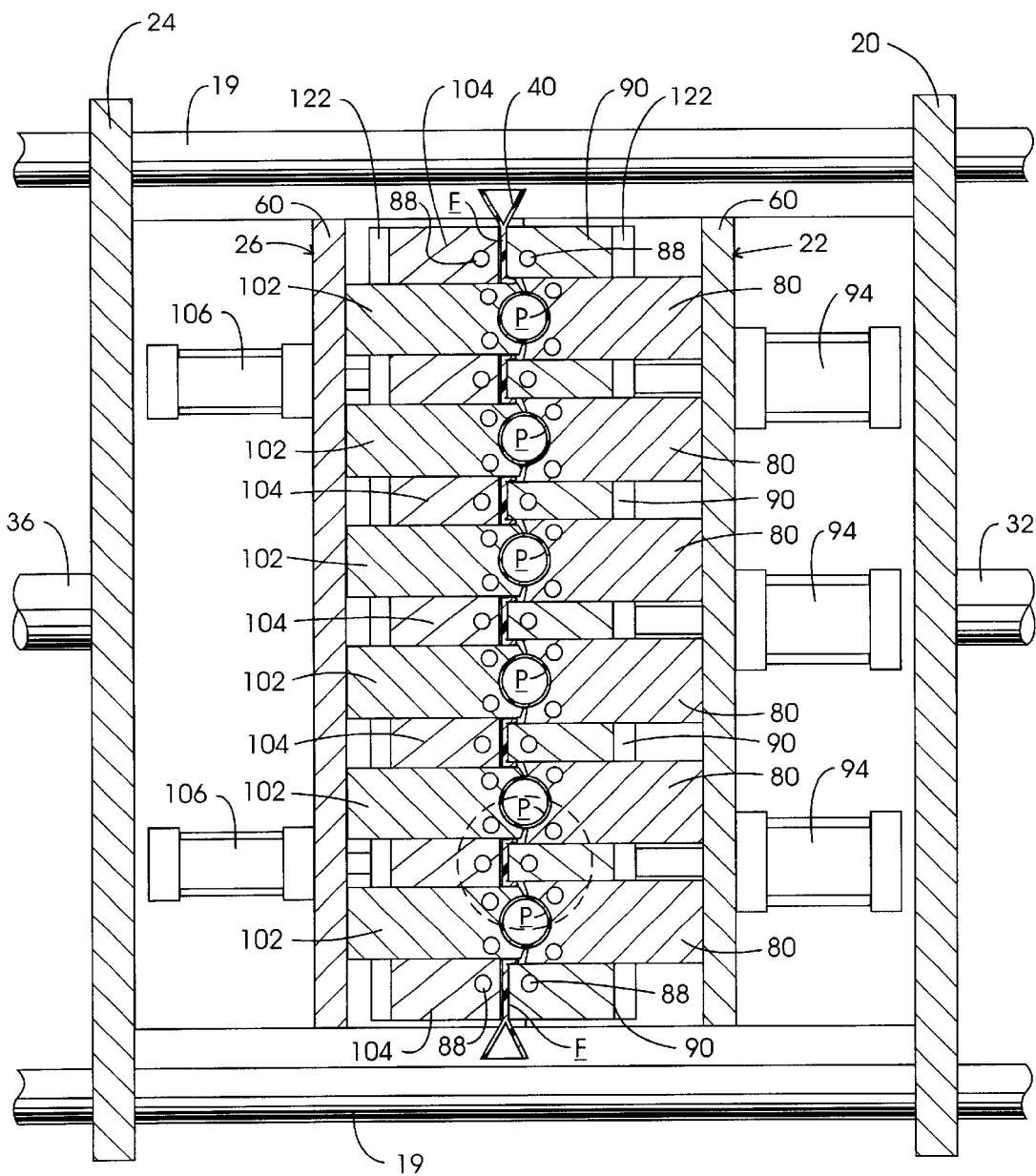
FIG. 7 is an elevation section view taken at line 6—6 of FIG. 4 at the completion of an in-mold intermediate gutter flash separation step.

As shown in FIG. 5, mold sub-assembly 22 is provided with a base plate 60 to which are rigidly attached are slotted platen mounting blocks 62 and 64, intermediate support block 66, and crash pads 68 and 70 which function to maintain a proper base blow-mold sub-assembly distance of separation from cap blow-mold sub-assembly 26 when such blow-mold sub-assemblies are positioned in an operationally closed condition with respect to each other, usually a small distance not exceeding approximately ten thousandths (0.010) of an inch and often only approximately one thousandth (0.001) of an inch. This separation distance may increase somewhat both when pressurized air is being injected into the interior of the parison segment constrained by the mold sub-assemblies during product formation, and also after the actuators forcing the the mold sub-assemblies together are relieved of internal fluid pressures prior to opening the mold sub-assemblies for product and gutter flash removal purposes. Crash pad 70 has projecting tapered guide pins 72 that co-operate with crash pad tapered guide pin receptacles provided in cap blow-mold assembly 26 upon closure; crash pad element 68 has tapered guide pin receptacles 74 that co-operate with the tapered guide pins provided in cap blow-mold assembly 26.

Base blow-mold sub-assembly 22 also includes multiple product molds 80 that are each rigidly mounted on base plate 60, and that each have a product cavity half 82, a pneumatically-actuated conventional bi-directional product ejector 84, and a pneumatically-actuated extendible and retractable inflation needle 86 that injects pressurized air into the interior of parison 40 to effect parison expansion. A pivotally-mounted gutter plate element 90 which surrounds each one of multiple product molds 80 is also included in sub-assembly 22 and such is provided with interconnected longitudinal and transverse cooling water passageways 88 that are connected to a flowing source of coolant such as cooling water. Each mold element 80 also is provided with cooling water passageways 92 that are preferably located in the region of the product mold parting line perimeter that also are, like coolant passageways 88, connected to a flowing source of coolant. In some applications the coolant may have a solidification temperature significantly lower than the solidification temperature of water, i.e. significantly lower than 32° Fahrenheit. See FIGS. 6 through 9 for further illustration of locating such coolant passageways in proximity to the product mold cavity mold parting line perimeter 112.

Figure 4:
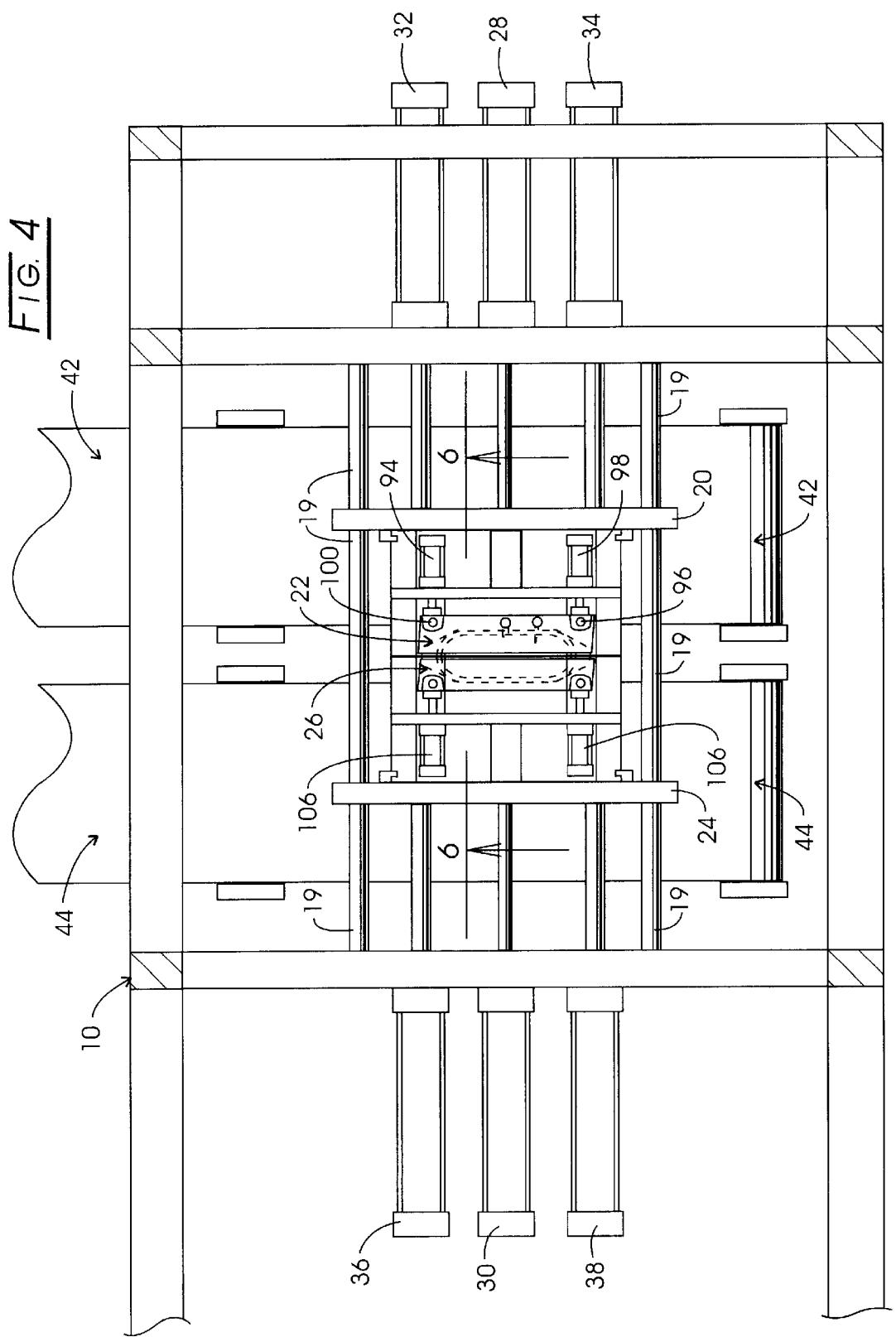
FIG. 4 is a plan section view taken at line 4—4 of FIG. 3.

Gutter plate element 90 is connected to and operationally powered by at least one bank of bi-directional hydraulic cylinders. Referring to FIGS. 4 and 5, and depending upon application specifics, only the bank of multiple hydraulic actuators 94 may be required to pivotally move gutter plate element 90 about its opposite pivot axis 96. However, when applicable geometry or the total available flash separation force developed by only one such bank of bi-directional hydraulic actuators proves marginally or clearly inadequate, an additional bank of bi-directional hydraulic actuators 98 may be provided and actuated sequentially or concurrently with respect to actuators 94 to additionally pivot gutter plate element about an opposite pivot axis 100. For clarity of illustration, additional details of construction preferred for gutter plate element 90 are shown separately in FIG. 33 of the drawings.

Figure 33:
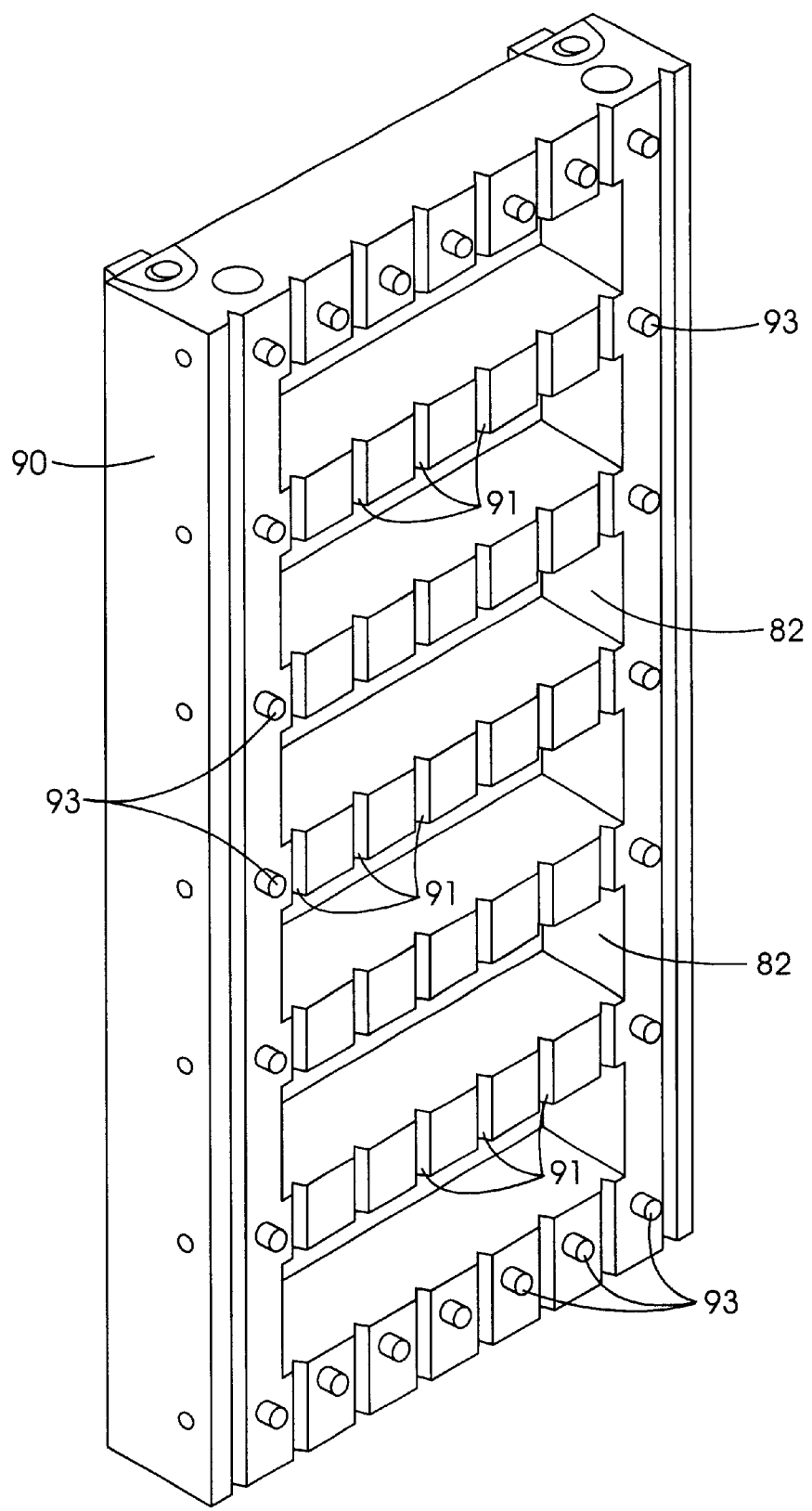
FIG. 33 is an isometric view of the invention base blow-mold sub-assembly illustrating additional construction details of that invention component.

Referring to FIG. 33, it may be seen that gutter plate element 90 has a plurality of V-shaped, groove-like recesses or reservoirs 91 that are formed in its face and extend transversely between, or radially outwardly from, the product mold openings of product molds 80. Such recesses or reservoirs accommodate excess heated parison resinous material associated with different programmed parison wall thicknesses. By having excess material flow into the reservoirs, the cooled gutter plate element 90 can contact the surface of the entire gutter flash better to ensure even cooling thereof. Illustrated retainer pin inserts 93 are provided and installed around the periphery of gutter plate element 90 and function to lock the edges of the gutter flash (F in FIG. 12) in place and prevent gutter flash edge shifting movement during gutter flash separation from the blow-molded thermoplastic resin product. Alternatively, retainer recesses, either in the form of blind-holes or through-holes, can be substituted for retainer pin inserts. Similar gutter flash excess resinous material groove-like reservoirs 91 are preferred also for gutter plate 104 of cap blow-mold sub-assembly 26.

Although not shown in FIG. 5, those side walls of mold elements 80 and/or those adjacent side walls of each congruent opening of gutter plate 90 surrounding the mold element are provided with tapered relief in the directions of mold/opening thickness in order to avoid physical interference between such components when gutter plate 90 is pivoted about either axis 96 or 100 and relative to mold elements 80.

As previously suggested, apparatus cap blow-mold sub-assembly 26 is basically constructed similarly to the construction of base blow-mold sub-assembly 22, but differs in several respects such as is particularly shown in FIGS. 6 through 9. The most notable differences are that the product molds 102 of sub-assembly 26 which co-operate with product molds 80 of sub-assembly 22 are sized differently as hereinafter described, and that the gutter plate element 104 of sub-assembly 26 is connected to and operationally actuated by a bank of bi-directional pneumatic actuators 106. In some instances or applications bi-directional hydraulic actuators may be substituted for the pneumatic bi-directional actuators. Also, and while not shown in the drawings or suggested elsewhere, other primary power sources such as electric motors combined with various mechanical linkages, devices, and the like may be substituted for components 94, 98, and 106 and utilized as the actuators that cause movement of gutter plates 90 and 104 relative to the co-operating product molds.

The fluid pressures of actuation-causing fluids supplied to bi-directional hydraulic actuators 94 and 98 are controlled so that the resulting actuation forces are substantially greater than the forces resulting from compressible actuation-causing fluids supplied to bi-directional pneumatic actuators 106 whereby gutter plate element 90, when pivoted, causes gutter plate element 104 to movably yield and the compressible fluids supplied to actuators 106 to be further compressed.

Figure 8:
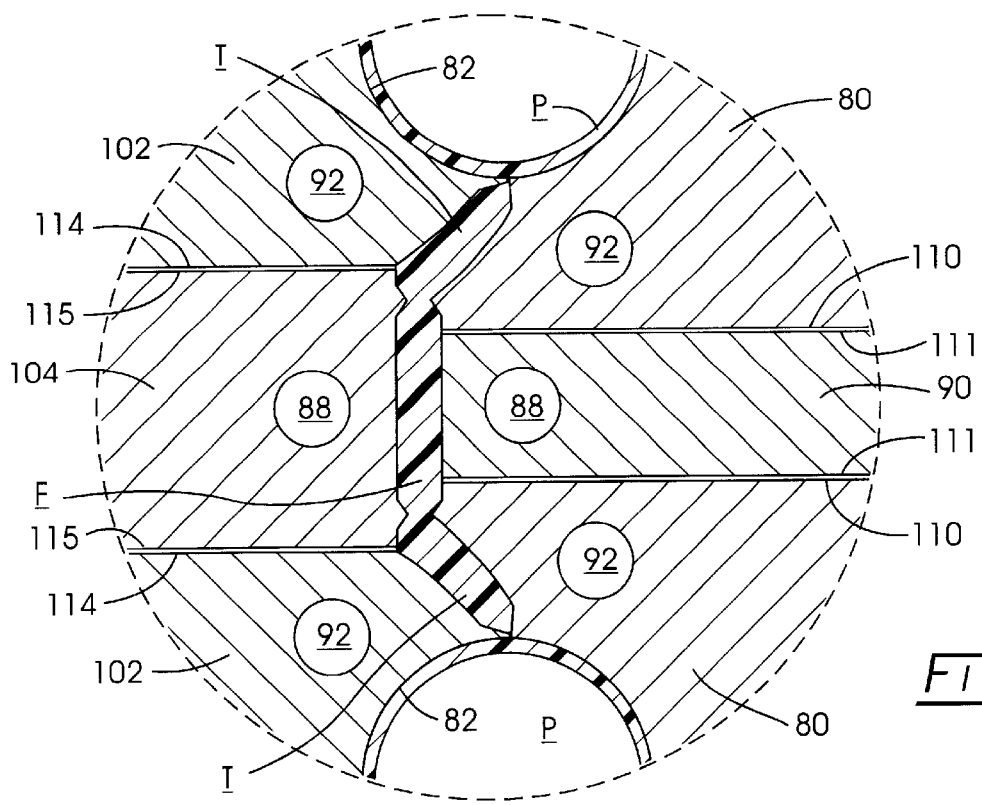
FIG. 8 is an enlarged view of a designated portion of FIG. 6.
Figure 9:
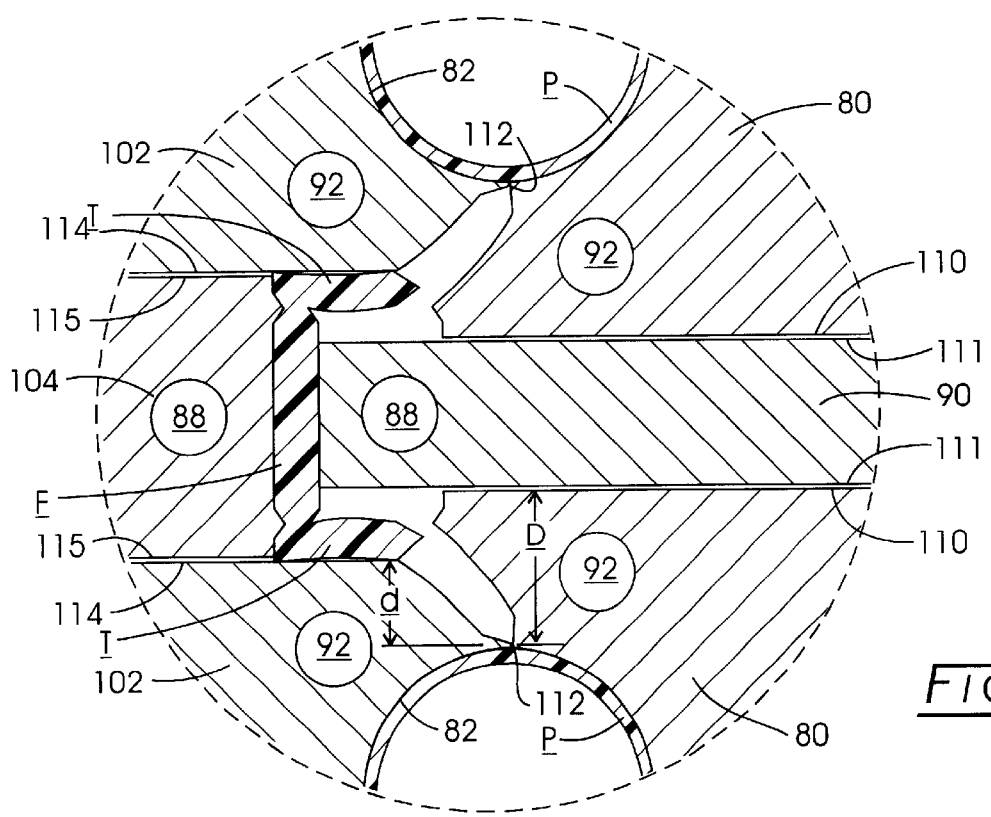
FIG. 9 is an enlarged view of a designated portion of FIG. 7.

Referring to FIGS. 8 and 9, each assembly mold element 80 is constructed to have an outside wall surface 110 that is congruent with the configuration of mold parting line perimeter 112 of blow-molded product P but is uniformly spaced away from perimeter 112 by the distance D which typically is about six-tenths (0.6) of an inch. The outside wall surface 114 of assembly mold element 102, on the other hand, while congruent with the configuration of product mold parting line perimeter 112 is spaced away from the parting line perimeter uniformly by the smaller distance d which typically is approximately three-tenths (0.3) of an inch. Generally, the preferred difference between dimensions D and d is in the range of approximately one-quarter to one-half inch. Product mold parting line perimeter 112 preferably is as little as about ten-thousandths (0.010) inch in width in a directions parallel to the direction of closure of blow-mold sub-assemblies 22 and 26, such width being controlled by the co-operating engagement of crash pads 68 and 70 of the two blow-mold sub-assemblies to additionally prevent mold sub-assembly damage caused by rapid traverse closing of machine platens 20 and 24.

In the blow-mold sub-assembly schemes of FIGS. 2 through 9, and because the forces for separating gutter flash F from blow-molded product P are developed by actuators 94 and 98 in directions normal to the plane of product mold parting line perimeters 112, it is advantageous to form multiple transition tabs T integrally with, and as a part of the gutter flash F surrounding each product mold cavity 82. Basically, each formed transition tab T is tapered and is angled or curved in the direction from product mold outside wall 114 toward product mold line perimeter 112. Thus, when solidified gutter flash F is moved by the movement of gutter plate element 90 from the condition shown in FIG. 8 to the condition illustrated in FIG. 9, each integral transition tab is separated from product P along product mold line perimeter 112 by tension forces and dragged upwardly into contact with product mold outside wall 114 and inside the mold volume between mold surfaces 110 and 114 as gutter plate element 104 retracts and as shown in FIG. 9. Accordingly, and to facilitate such placement of transition tab T upon mold outside wall 114, transition tab T is advantageously segmented along the product mold parting line perimeter 112 by appropriately positioned multiple transition tab slits S (see FIG. 10). Generally, a transition tab slit S is formed by the presence of a transition tab divider provided at each substantial change in mold perimeter direction, such as at a perimeter corner or substantial linear departure, and also at uniformly spaced-apart intervals along each mold perimeter segment of substantial curvature. Such slits S can be conveniently formed by providing spaced-apart, thin transverse transition tab slit dam elements in the transition tab zones and integral with either base blow-mold sub-assembly product molds 80 or cap blow-mold sub-assembly product molds 102 at the desired transition tab slit locations. Slits S function to allow gutter flash F to fold easily during movement in the mold volume or zone between mold outer wall surfaces 110 and 114 as mentioned above.

Figure 10:
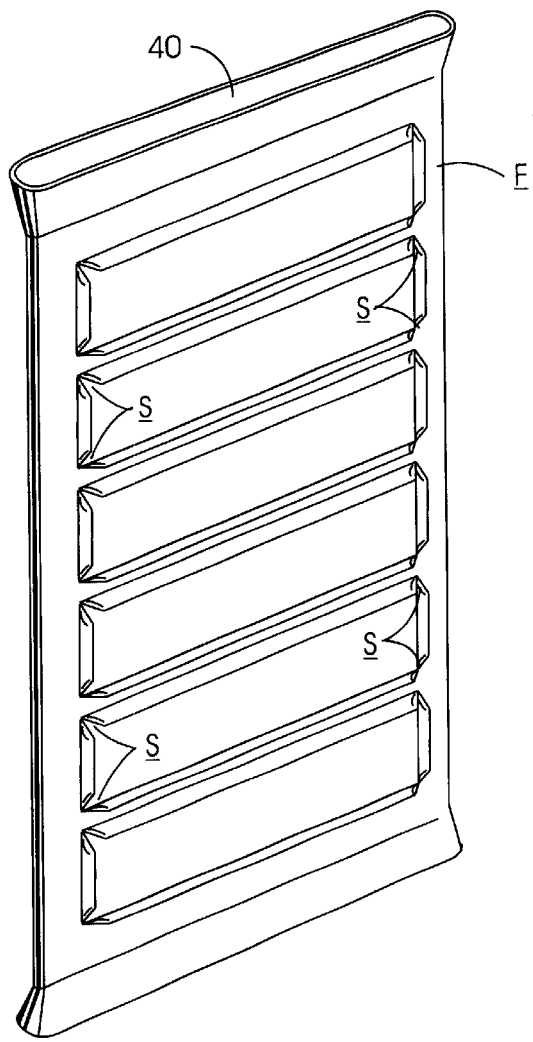
FIG. 10 is an isometric view of the gutter flash ejected from the invention blow-mold sub-assemblies following completion of the invention in-mold gutter flash separation step.
Figure 11:
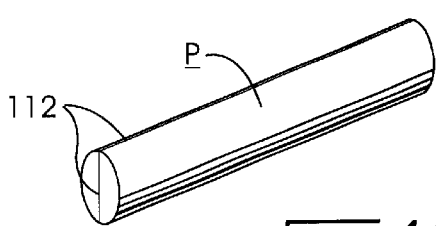
FIG. 11 is an isometric view of the generally cylindrical, hollow thermoplastic product blow-molded in the product mold cavities of the invention multi-cavity blow-mold sub-assemblies.
Figure 12:
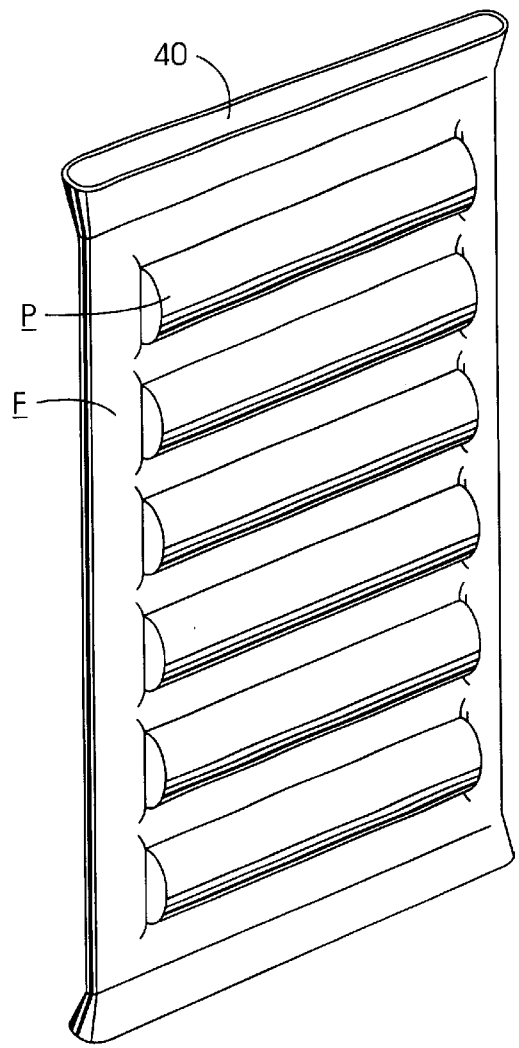
FIG. 12 is an isometric view of the prior art product and integrally attached gutter flash conventionally removed from production blow-molding machines incorporating known state of the art blow-mold sub-assemblies.

FIGS. 10 and 11 respectively illustrate the gutter flash F formed within blow-mold sub-assemblies 22 and 26 following separation from blow-molded product P and the separated product P following their ejection from such blow-mold sub-assemblies. Gutter flash F is freed from contact with mold outside wall 114 by the action of bi-directional pneumatic/hydraulic actuators 106. Each unit of product P is freed from retention in a mold cavity 82 by proper sequential actuation of bi-directional pneumatic product ejectors 84.

Figure 13:
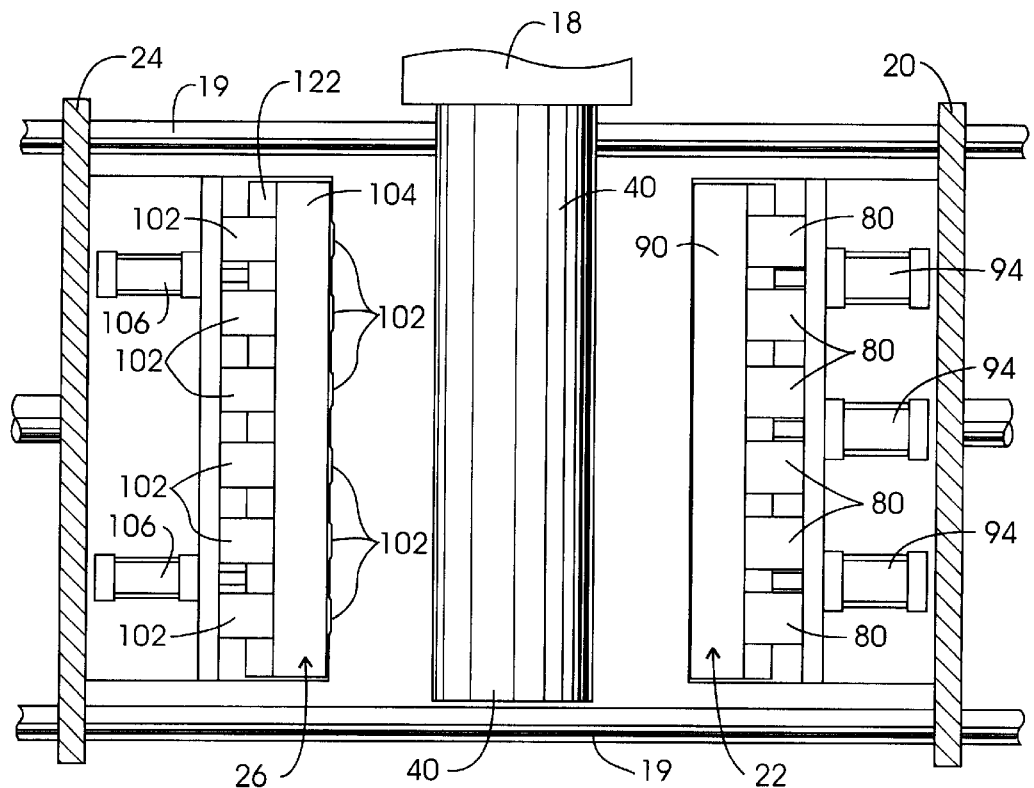
FIGS. 13 through 18 are schematic partial blow-molding machine section views illustrating key points in the method step sequence which is practiced during utilization of the apparatus of the present invention.
Figure 14:
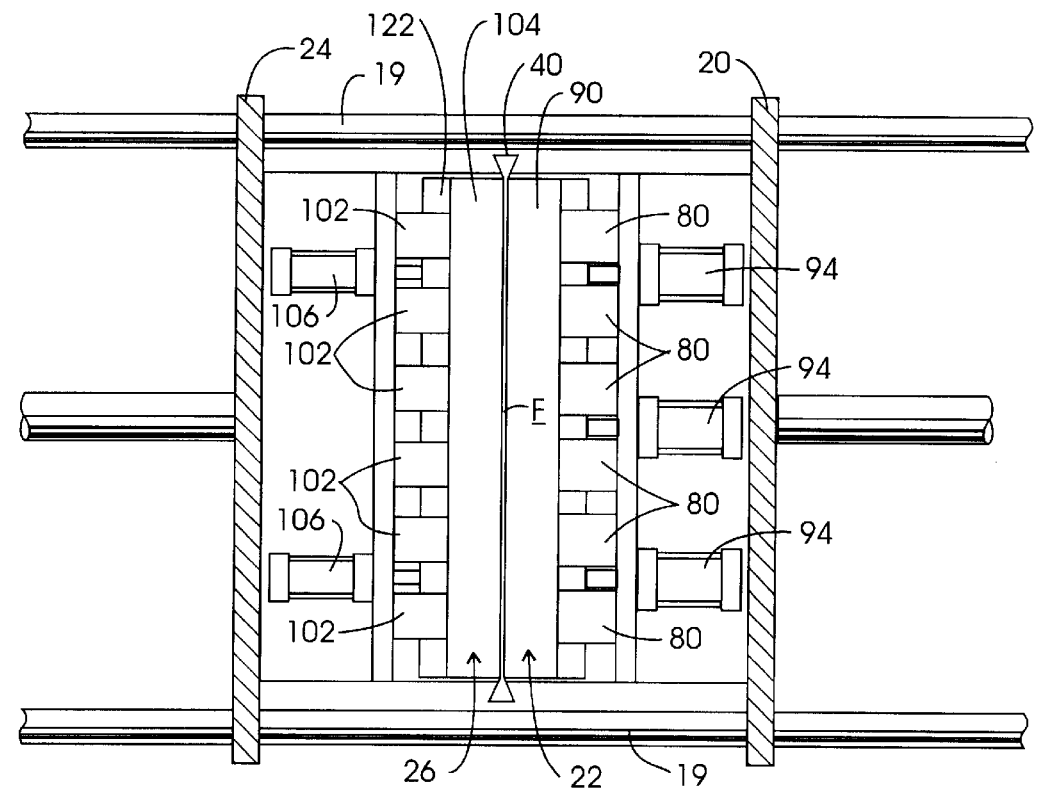
Figure 15:
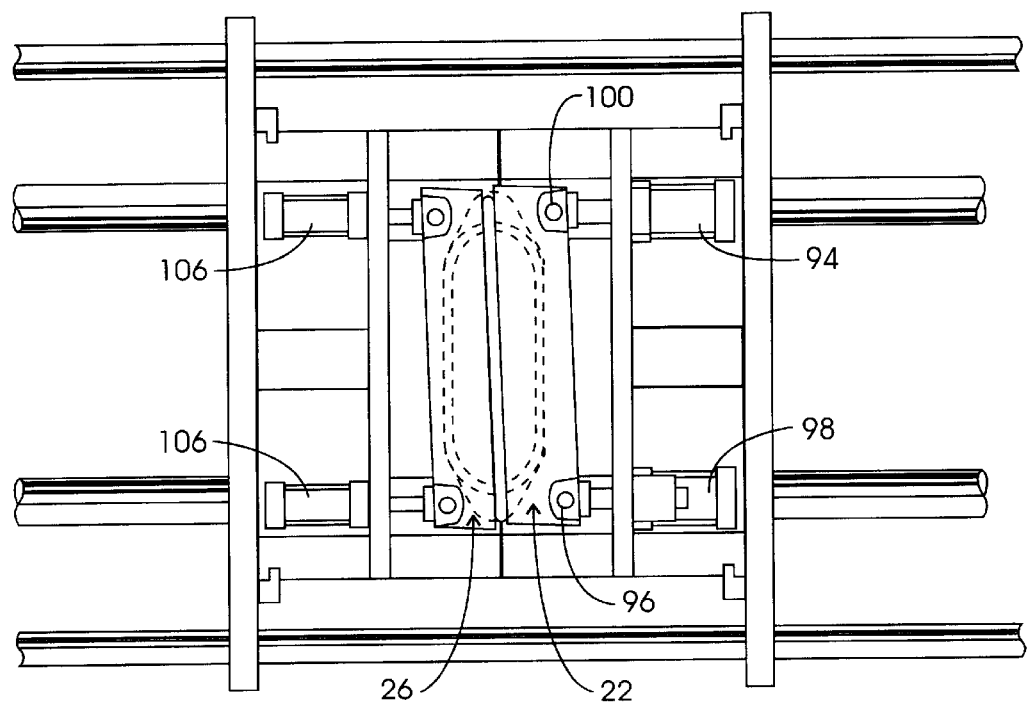
Figure 16:
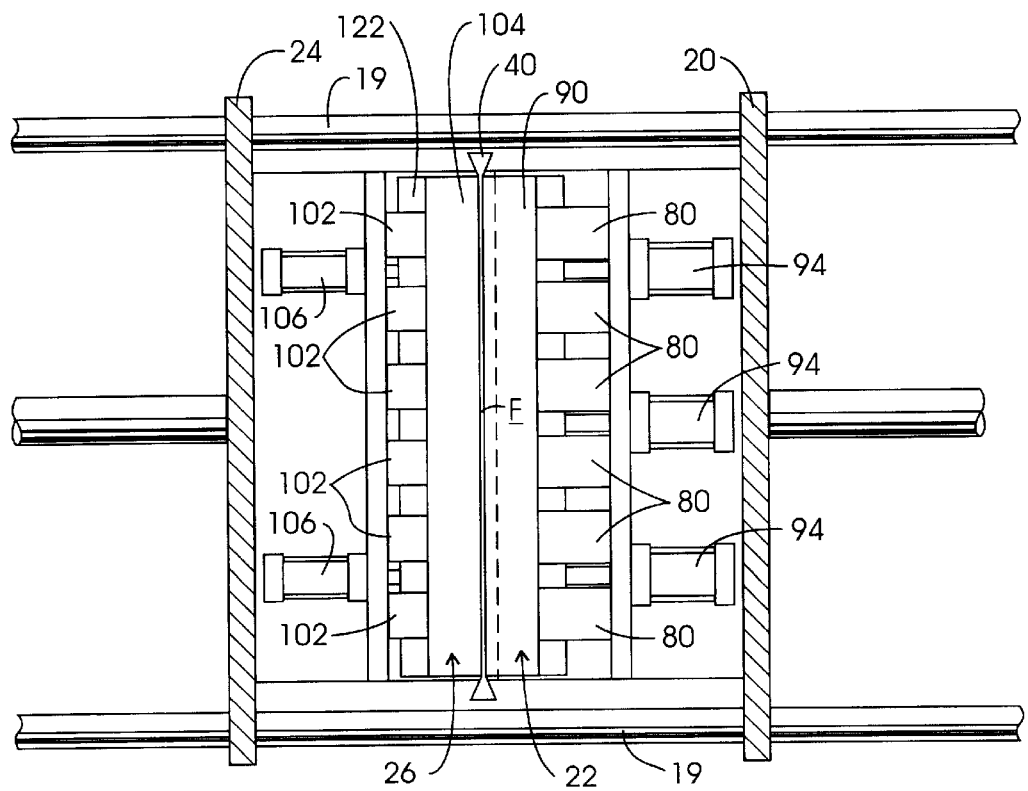

FIGS. 13 through 18 schematically illustrate the sequence of key steps that are accomplished during a complete production machine cycle utilizing utilizing blow-mold sub-assemblies 22 and 26. FIG. 13 illustrates such blow-mold sub-assemblies in their cycle initially separated or fully-open condition and extruded and heated thermoplastic resin parison 40. FIG. 14 is similar to FIG. 13 but shows the blow-mold sub-assemblies in their subsequent operationally-closed condition with parison 40 contained therebetween. FIG. 15 is a plan view illustrating gutter plate element 90 fully pivoted about pivot axis 96 by bi-directional hydraulic actuators 94 to effect progressive separation of the contained gutter flash from the fully-restrained blow-molded product to which it was integrally attached either wholly or, in some cases depending upon specific apparatus geometry considerations, possibly only partially. In instances where the progressive gutter flash separation action is not fully completed by operation of hydraulic actuators 94, bi-directional hydraulic actuators 98 are actuated to cause additional pivoting separation movement of gutter plate 90 about pivot axis 100 to its FIG. 16 gutter flash fully-separated condition. Bi-directional pneumatic actuators 106 are normally activated at this stage of the production cycle but because they are operated with a compressible fluid they readily yield to the gutter plate displacement forces generated by hydraulic actuators 94 and 98.

Figure 17:
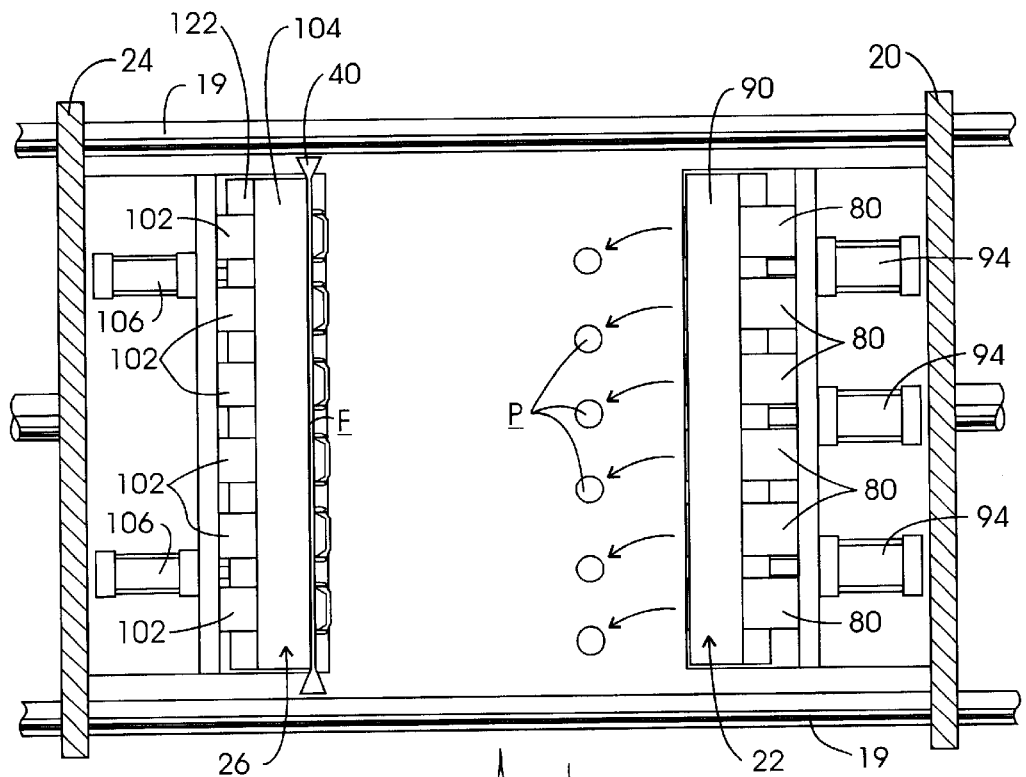

FIG. 17 illustrates blow-mold sub-assemblies subsequently returned to their initial or fully-open condition and with separated gutter flash F retained upon the outside walls of the product molds 102 included in cap blow-mold sub-assembly 26. With blow-mold 22 in its FIG. 17 position, product ejectors 84 are actuated to cause contained units of product P to be ejected from their respective mold cavities 82 so that they will fall onto product conveyor 42 for removal from within blow-mold machine 10.

Figure 18:
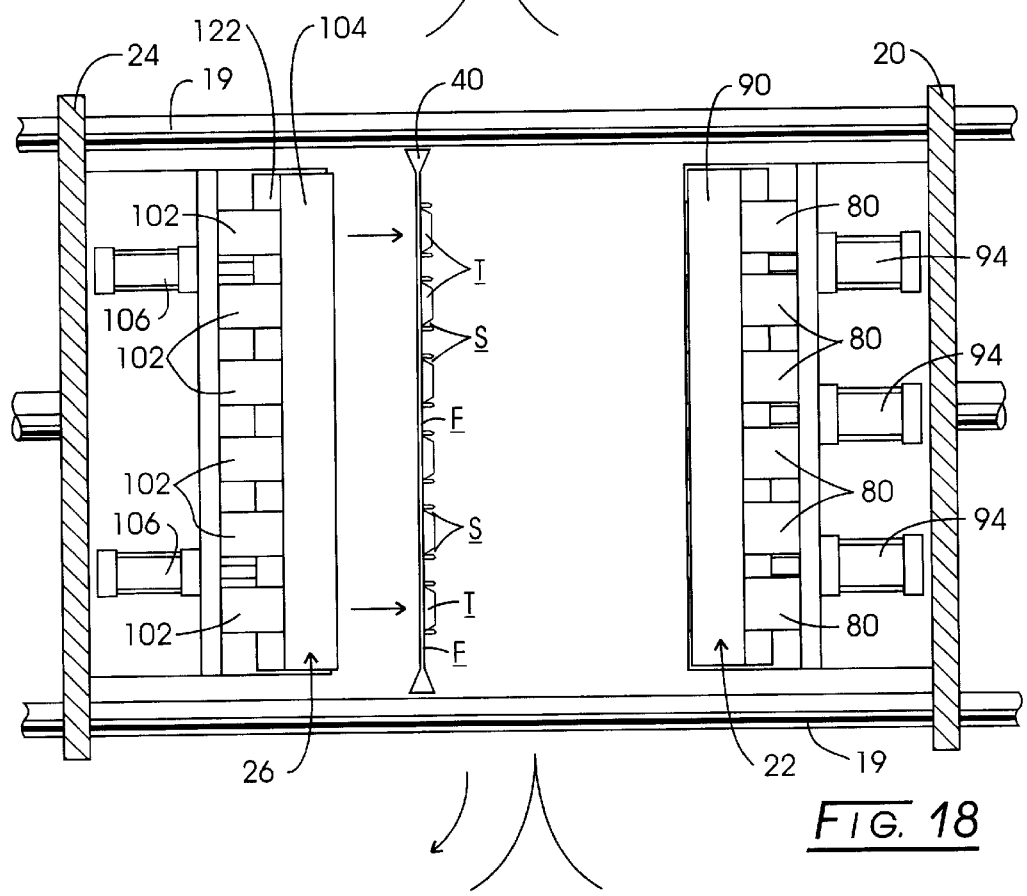
Figure 19:
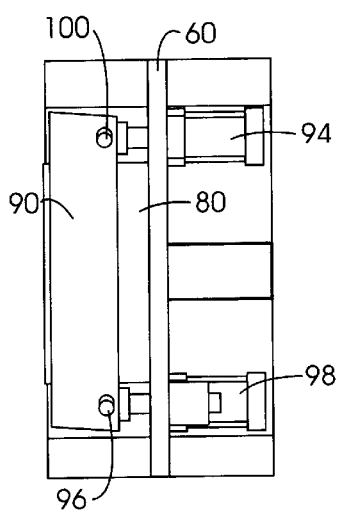
FIGS. 19 through 21 are schematic plan views illustrating the base and cap gutter plate components of the FIG. 1 through 7 apparatus positioned in three different successive operating conditions.
Figure 20:
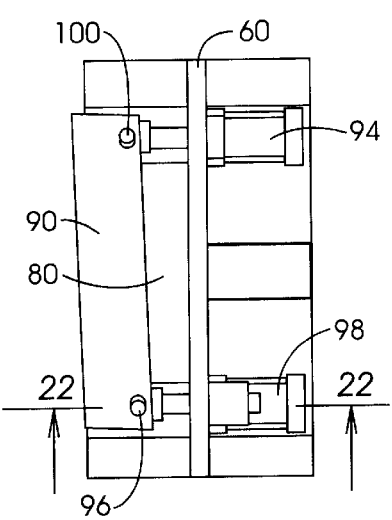
Figure 21:
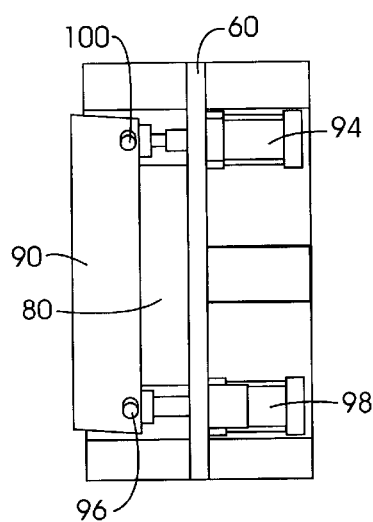

FIG. 18 illustrates gutter flash F after it has been separated from blow-mold sub-assembly 26 by the operation of pneumatic actuators 106. Such gutter flash then drops to the discharge conveyor 44 also for removal from within blow-mold machine 10. The next production cycles can then be commenced by causing additional thermoplastic resin parison material to descend sufficiently from parison die head 18 so that blow-mold sub-assemblies 22 and 26 can then be moved to their fully-closed and clamped condition by operation of machine bi-directional hydraulic actuators 28 through 38.

FIGS. 19 through 23 are provided to illustrate some additional construction details that are preferred for incorporation into blow-mold sub-assemblies 22 and 26. Plan views 19 through 21 respectively illustrate gutter plate element 90 in its non-pivoted, partially-pivoted, and fully-pivoted operating cycle conditions. In these views gutter plate element 90 rotates about pivot axis 96. In some applications the gutter plate element must additionally be rotated about a provided pivot axis 100 in order to achieve full gutter flash separation from the completely restrained formed thermoplastic resin product. As previously indicated, in some applications it is not necessary to further pivot gutter plate element 90 beyond its FIG. 20 condition in order to obtain a full separation of gutter flash F from the contained units of product P.

Figure 22:
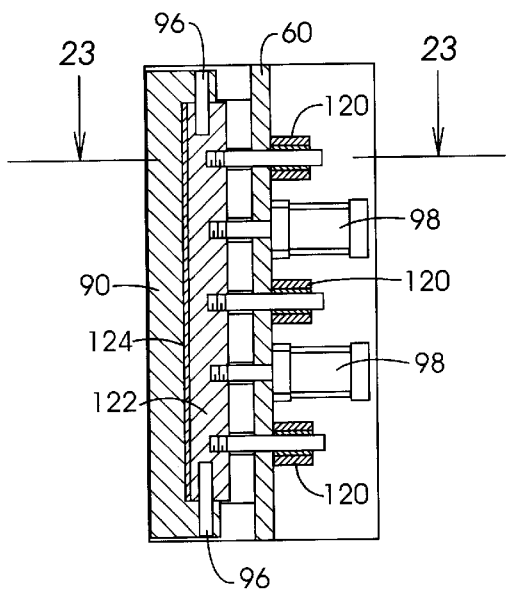
FIG. 22 is a section view taken at line 22—22 of FIG. 20.
Figure 23:
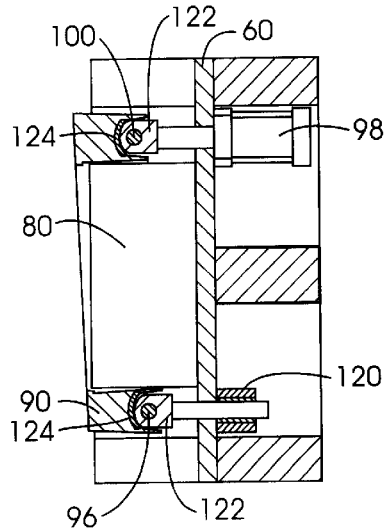
FIG. 23 is a section view taken at line 23—23 of FIG. 22.

FIGS. 22 and 23 illustrate the preferred utilization of conventional bronze, linear guide bushings 120 to prevent side thrust loads from being induced into bi-directional hydraulic actuators 94 or 98 during pivoting movement of gutter plate element 90. Also, I prefer that the pivoting forces originating with system actuators 94, 98, and 106 be transmitted into gutter plates 90 and 104 through a force distribution bar element 122 and bronze wear plate 124 combination. Because the pin-type pivot axes 96 and 100 co-operate with elongated pivot pin receptacles provided in gutter plate 90 or 104 (see FIGS. 19 through 21), gutter plates 90 and 104 can move laterally relative to wear plate 124 as necessary.

Figure 24:
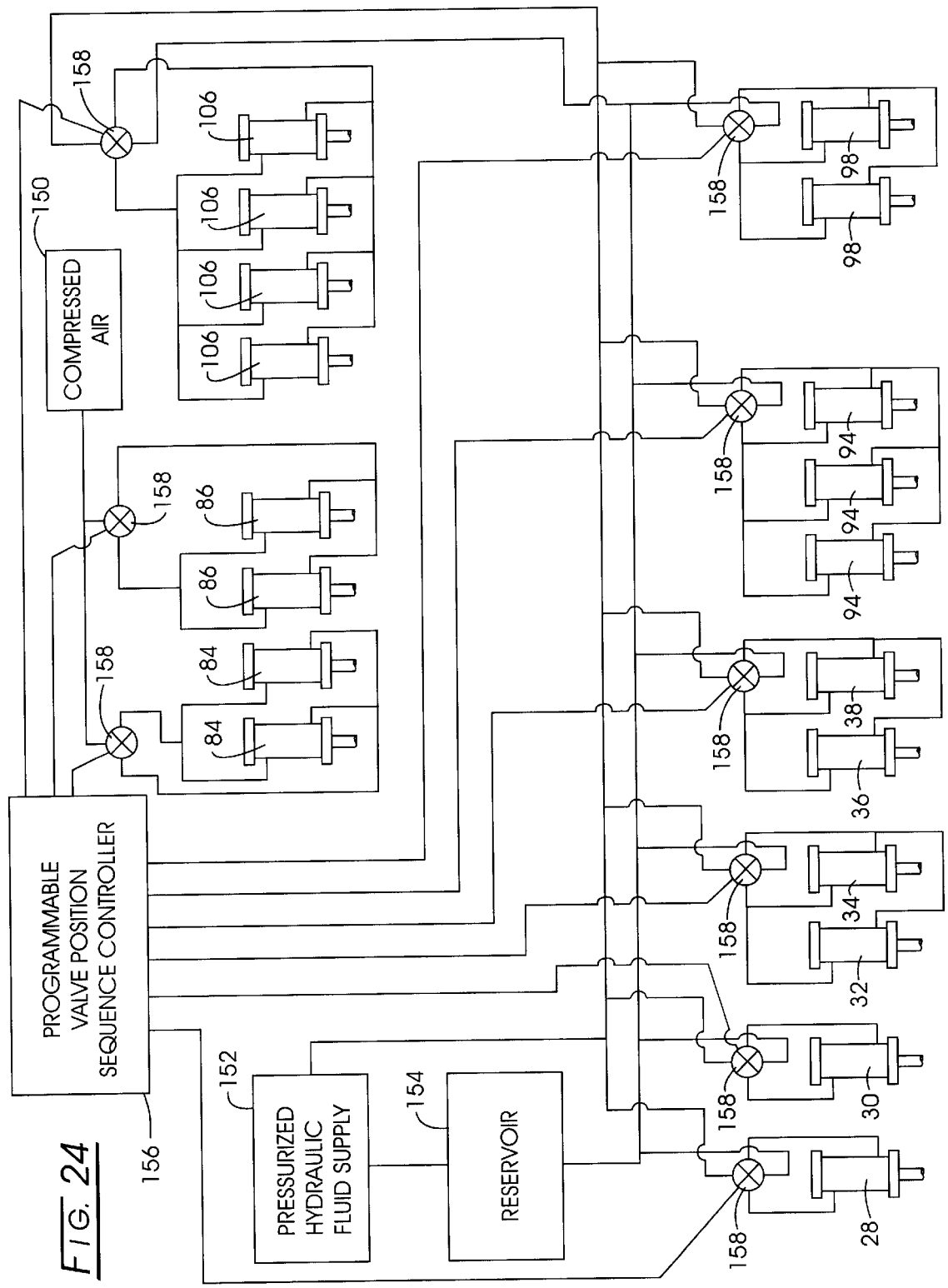
FIG. 24 is a schematic diagram of one form of control system that may be utilized to obtain proper sequencing of the several bi-directional actuators incorporated in the apparatus of FIGS. 1 through 7.
Figure 25:
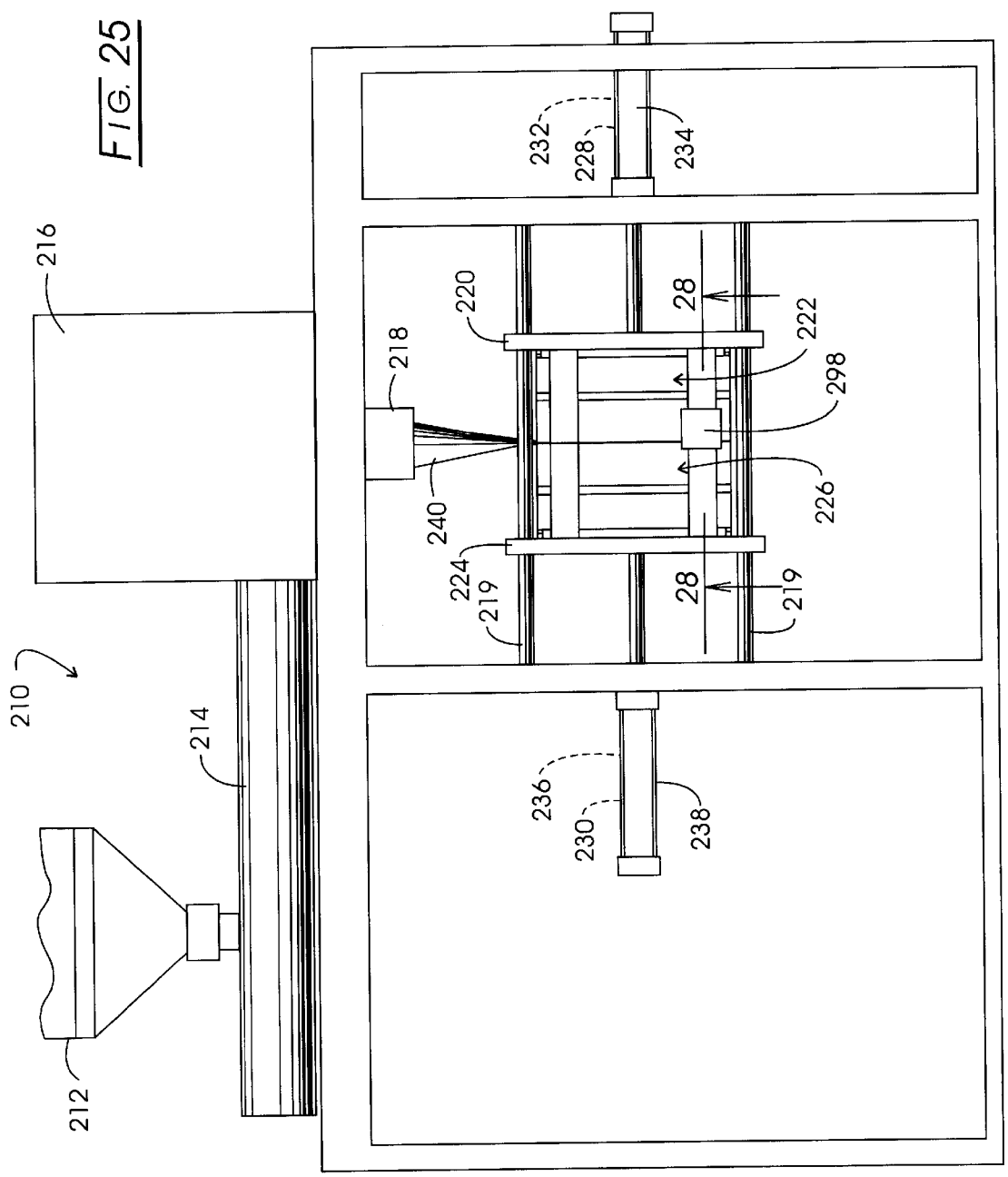
FIG. 25 is a schematic elevation view similar to FIG. 3 but of the interior of the blow-molding machine of FIG. 1 incorporating another embodiment of the blow-mold sub-assemblies of the present invention.

FIG. 24 schematically illustrates one type of control system that may be utilized in connection with combined blow-mold sub-assemblies 22 and 26 to obtain proper sequencing of the different incorporated pneumatic/hydraulic bi-directional actuators in order to carry out the basic product de-flashing steps of my method invention for different specific-product applications. Such control system preferably includes a compressed air source 150, a pressurized hydraulic fluid supply 152 with fluid reservoir 154, and a conventional programmable valve position sequence controller 156 that sequentially activates each of the included conventional 4-way fluid valves 158 to its different valve operating positions and thereby achieve full extension or full retraction of each of the specifically numbered bi-directional actuators connected thereto at the proper time in each production cycle of blow-molding machine 10.

The basic sequence of steps for operating blow-molding machine or system 10, including blow-mold sub-assemblies 22 and 26, for a complete machine production cycle are as follows:

1. Activate machine 10.
2. Retract platens 20 and 24 to fully-separate (open) blow-mold sub-assemblies 22 and 26 (machine function).
3. Cause heated tubular thermoplastic resin parison 40 to descend from die-head 18 to lower edges of assemblies 22 and 26 (machine function).
4. Rapid advance platens 20 and 24 sufficient to engage all crash pads 68 and 70 and thereby fully close blow-mold sub-assemblies 22 and 26 by actuating rapid traverse hydraulic actuators 28 and 30 (machine function).
5. Clamp blow-mold sub-assemblies 22 and 26 together by simultaneously activating hydraulic actuators 32, 34, 36, and 38 (machine function).
6. Insert inflation needles 86 into the descended parison contained within mold assemblies 22 and 26.
7. Inject compressed air into contained parison thereby expanding heated parison thermoplastic resin into complete contact with the product cavities 82 of blow-mold sub-assemblies 22 and 26 (machine function) and form thermoplastic resin product P.
8. Activate bi-directional hydraulic actuators 94 and bi-directional pneumatic actuators 106 each to a pressure level that causes gutter plates 90 and 104 to engage and contact fully the gutter flash F, and to flow excess thermoplastic resin parison material into surface reservoirs 91, whereupon accelerated cooling of parison gutter flash material commences.
9. Activate bi-directional hydraulic actuators 94 to pivot gutter plates 90 and 104 thereby separating gutter flash F from blow-molded product P progressively along the product mold parting line perimeter using tension forces.
10. Optionally, and if necessary to complete gutter flash separation, activate bi-directional hydraulic actuators 98 to additionally pivot ("rock") gutter plates 90 and 104 but in an opposite rotational sense to thereby complete separation of gutter flash F from blow-molded product P progressively along the product mold parting line perimeter using tension forces.
11. Activate base blow-mold sub-assembly hydraulic bi-directional actuators 94 (and 98, if utilized) to move separated gutter flash onto cap mold sub-assembly blow molds 102.
12. Reverse the actuation direction of clamping bi-directional hydraulic actuators 32, 34, 36, and 38 (machine function).
13. Reverse the actuation direction of bi-directional rapid traverse hydraulic actuator 28 to partially separate and open blow-mold assemblies 22 and 26.
14. Reverse the actuation direction of bi-directional rapid traverse hydraulic actuator 30 to fully separate and open blow-mold sub-assemblies 22 and 26.
15. Actuate product ejectors 84 to release product units P from blow-mold cavities 82 for free-fall to the machine product removal conveyor 42.
16. Actuate pneumatic bi-directional actuators 106 to separate gutter flash F from engagement with the product molds 102 of blow-mold sub-assembly 26 for free-fall to the machine product removal conveyor 44.
17. Repeat steps 3 through 16 to end of machine production run.
18. Deactivate machine 10.

The time required for completing the sequence of steps 3 through 16 is typically in the range of 45 to 120 seconds for industrial blow-molding systems of the type specifically identified in connection with machine 10.

In instances wherein very large blow-molding machine throat dimensions are involved, and sometimes in blow-molding applications wherein the product being blow-molded has a relatively long major dimension, it may prove advantageous to utilize an alternate form of apparatus blow-mold assembly to obtain desired progressive separation of integrally attached gutter flash from the blow-molded product along the product's mold parting-line perimeter. A suitable alternate form for the invention blow-mold sub-assemblies for this purpose are schematically illustrated and detailed in FIGS. 25 through 29 of the drawings, and are shown installed in a conventional industrial blow-molding system 210 similar to blow-molding machine 10.

Machine 210 typically includes the illustrated feedstock hopper 212, a feed screw feedstock conveyor 214, and a conventional melter-accumulator-extruder subassembly 216 with variably-controlled parison die head 218. Machine 210 also includes guideposts 219 upon which movable platens 220 and 224 reciprocate. Movable machine platen 220 carries base blow-mold sub-assembly 222 and movable machine platen 224 carries cap blow-mold sub-assembly 226. Although such base and cap blow-mold sub-assemblies have co-operating complementary product molds 280 and 302 with product-forming cavities 282 and with generally similar constructions, their respective total function and mode of operation differ. For instance, only base blow-mold sub-assembly 222 is provided with a gutter plate element and with co-operating bi-directional gutter plate actuators.

Machine platen 220 is powered by bi-directional rapid traverse hydraulic actuator 228 and additionally by bi-directional clamping hydraulic actuators 232 and 234; machine platen 224 is powered by bi-directional rapid traverse hydraulic actuator 230 and additionally by bi-directional clamping hydraulic actuators 236 and 238.

Figure 26:
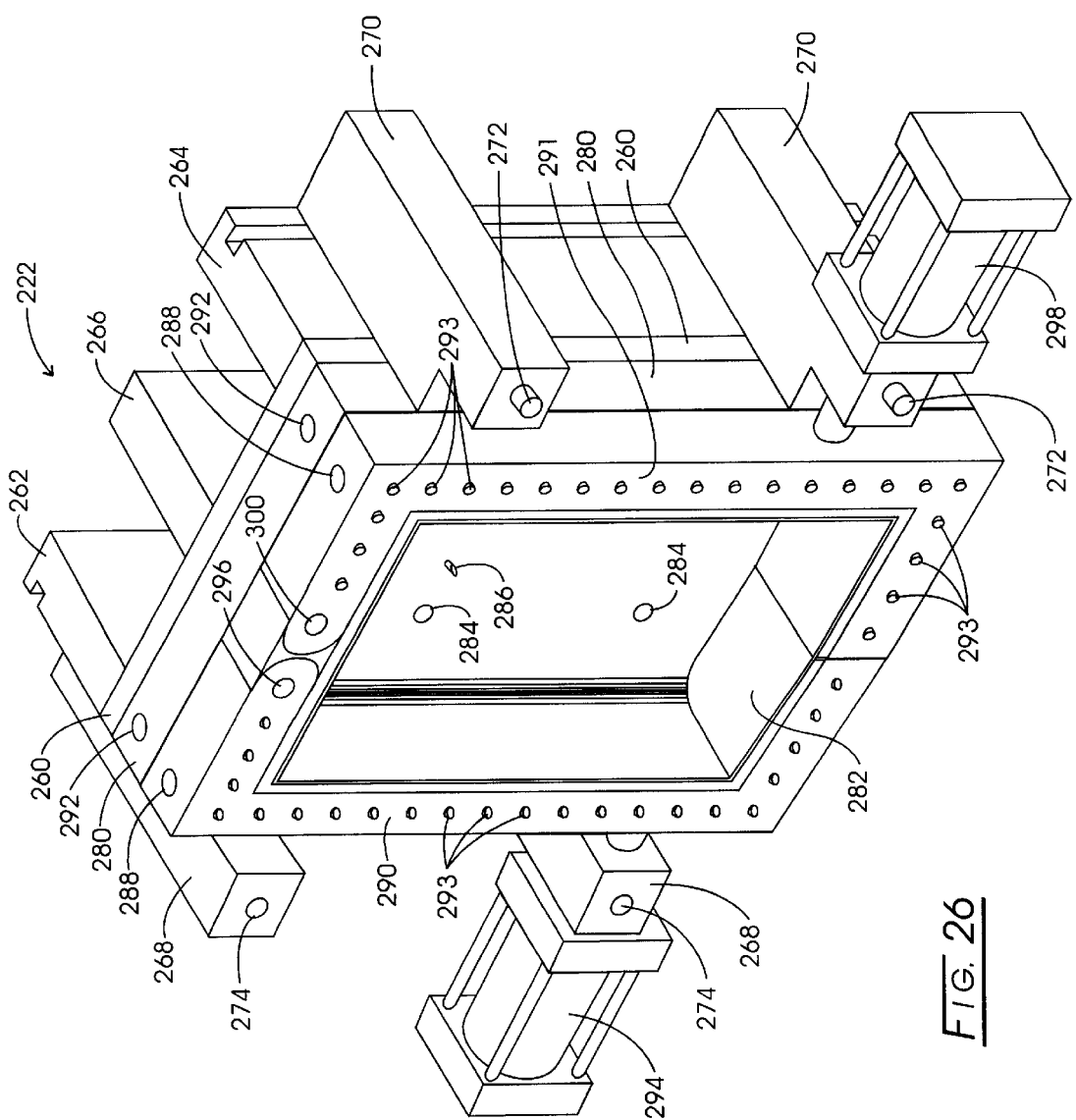
FIG. 26 is an isometric view of one of the single-cavity blow-mold sub-assemblies illustrated in FIG. 25 in an initial operating condition.
Figure 27:
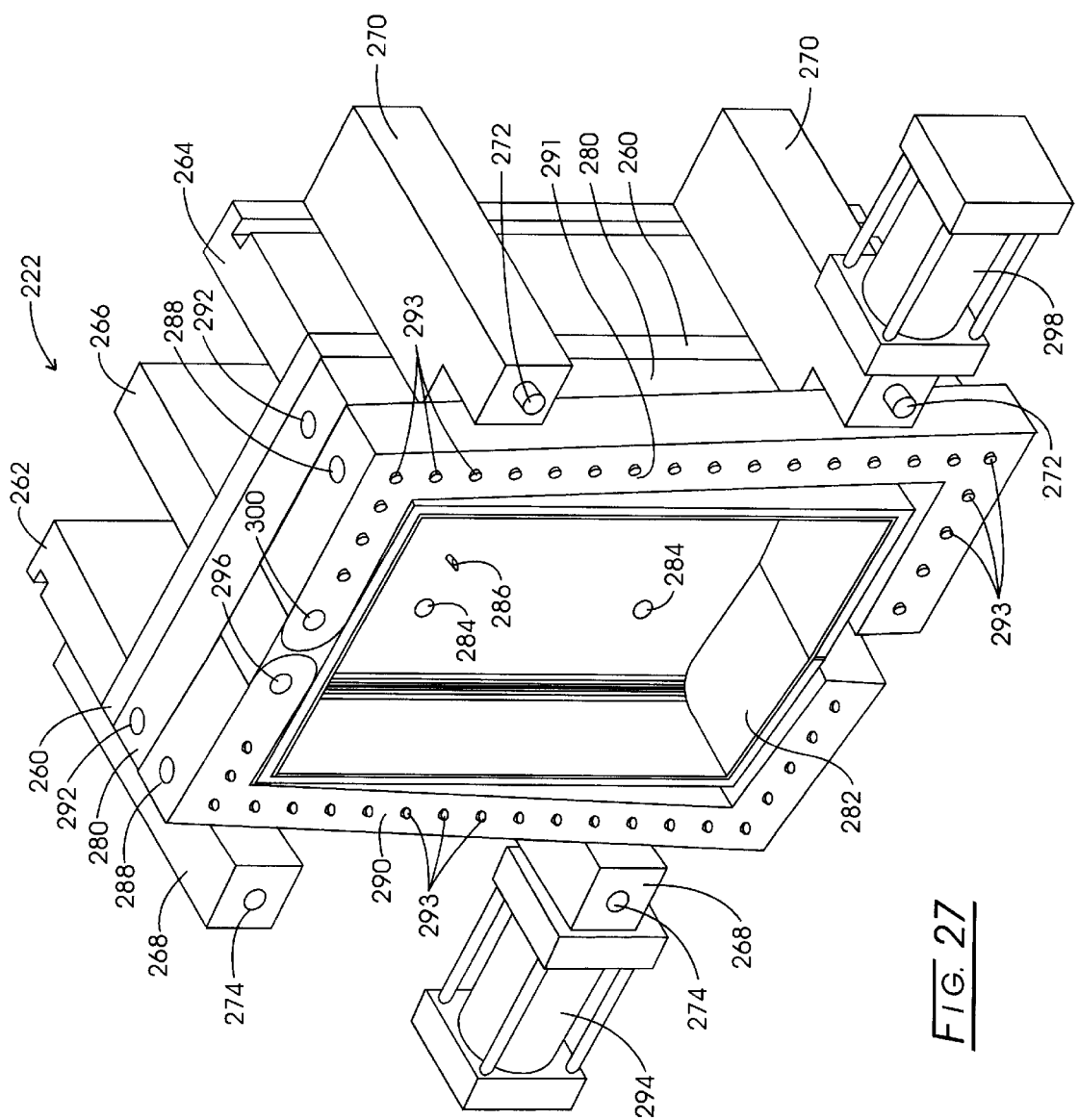
FIG. 27 is a view similar to FIG. 26 but illustrating the alternate embodiment blow-mold sub-assemblies in a subsequent operating condition.
Figure 28:
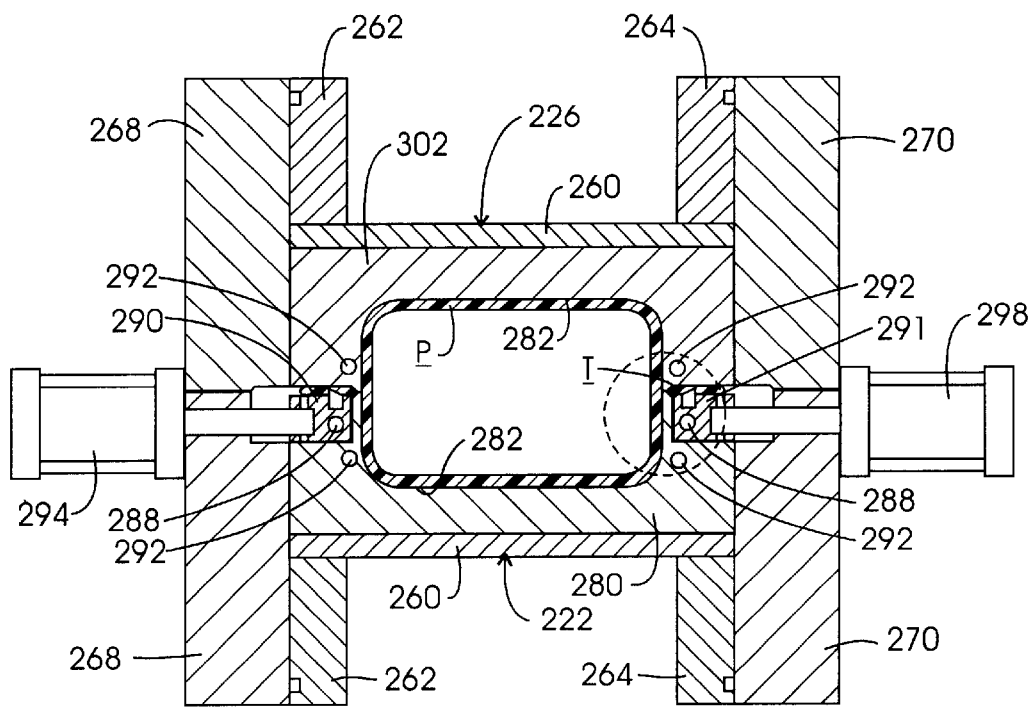
FIG. 28 is a section view taken at line 28—28 of FIG. 25 in an initial operating condition.
Figure 29:
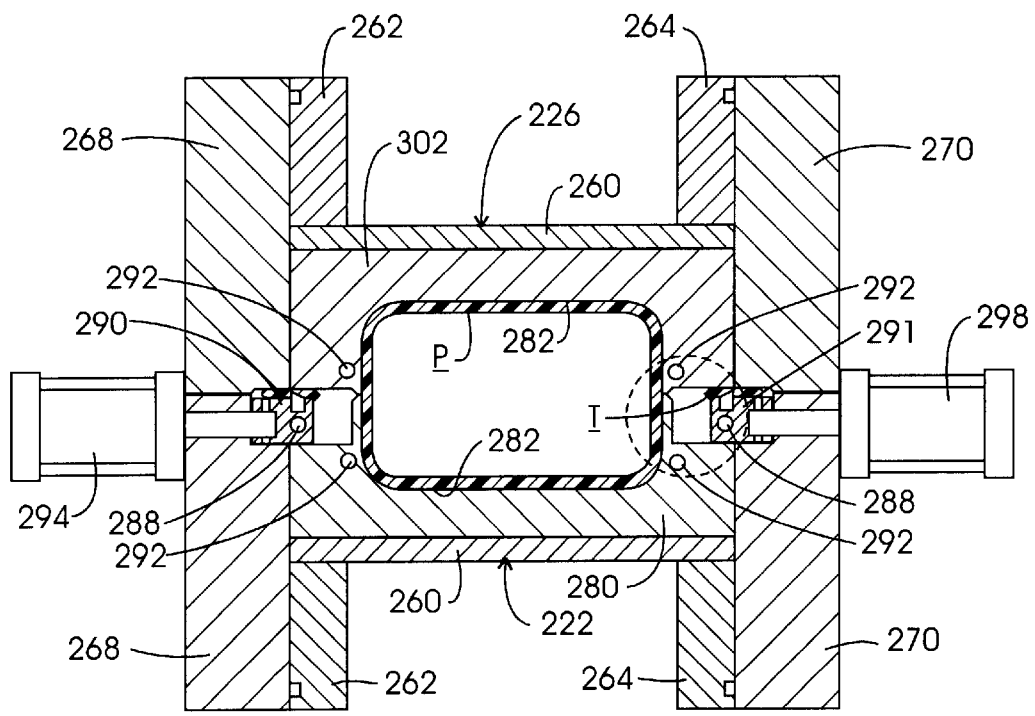
FIG. 29 is a view similar to FIG. 28 but in a subsequent operating condition.

As shown in FIGS. 26 and 27, blow-mold sub-assembly 222 is provided with a base plate 260 to which are rigidly attached are slotted platen mounting blocks 262 and 264, intermediate support block 266, and crash pads 268 and 270 which function to maintain a proper base blow-mold assembly distance of separation from cap blow-mold subassembly 226 when such blow-mold subassemblies are positioned in an operationally-closed condition with respect to each other, usually approximately one thousandth (0.001) of an inch. Crash pads 270 have projecting tapered guide pins 272 that co-operate with respective crash pad tapered guide pin receptacles provided in cap blow-mold subassembly 226 upon closure; crash pad elements 268 have tapered guide pin receptacles 274 that co-operate with respective tapered guide pins provided in cap blow-mold sub-assembly 226.

Base blow-mold sub-assembly 222 also includes a single-cavity or multiple-cavity product mold 280 that is rigidly mounted on base plate 260 and that has an interior product cavity half 282, pneumatically-actuated conventional bi-directional product ejectors 284, and a pneumatically-actuated extendible and retractable inflation needle 286 that injects pressurized air into the interior of parison 240 to effect parison expansion. An articulated and pivotally-mounted gutter plate combination comprised of generally U-shaped gutter plate elements 290 and 291 that surround product cavity 282 of product mold 280 is also included in sub-assembly 222 and such are each provided with cooling water passageways 288 that are connected to a flowing source of cooling water. Mold element 280 also is provided with cooling water passageways 292 (see FIGS. 26 and 27) that are preferably located in the region of the product mold parting line perimeter that also are, like coolant passageways 288, connected to a flowing source of cooling water. See FIGS. 30 and 31 for further illustration of the manner of locating such coolant passageways.

Gutter plate elements 290 and 291 are each connected to and operationally powered by a respective one of bi-directional hydraulic cylinders 294 and 298. Hydraulic actuator 294 functions to pivotally move gutter plate element 290 about its pivot axis 296. Bi-directional hydraulic actuator 298 functions to pivot gutter plate element 291 about its pivot axis 300 and may be operated either sequentially or concurrently with respect to actuator 294. In instances where gutter plate elements 290 and 291 are of a length such that pivoting about an axis at only one end thereof is insufficient to accomplish full gutter flash separation, elements 290 and 291 may each be modified to also pivot about a second axis positioned at the end opposite the first end. Additionally, each one of gutter plate elements 290 and 291 are provided with flash edge retainer elements 293 (either short protrusion inserts or retainer recesses) that embed or become embedded in the parison thermoplastic resin material captured between the faces of the gutter plate elements when blow-mold sub-assemblies 222 and 226 become clamped to thereby enhance the transmission of tension forces originating with hydraulic actuators 294 and 298 in effecting gutter flash separation. Note also, that in the FIGS. 25 through 29 embodiment of the instant invention product cavities 282 in blow-mold sub-assemblies 222 and 226 are separated from each other by the height of the product mold parting line perimeter 312 and since the forces generated by actuators 294 and 298 are in planes that are parallel to the plane of the product mold parting line perimeter it is not necessary to provide, as in FIGS. 8a and 9, an angled or curved inter-mold transition zone for forming the tapered transition tab T feature that is included and integrally attached to and retained as a part of gutter flash F.

Figure 32:
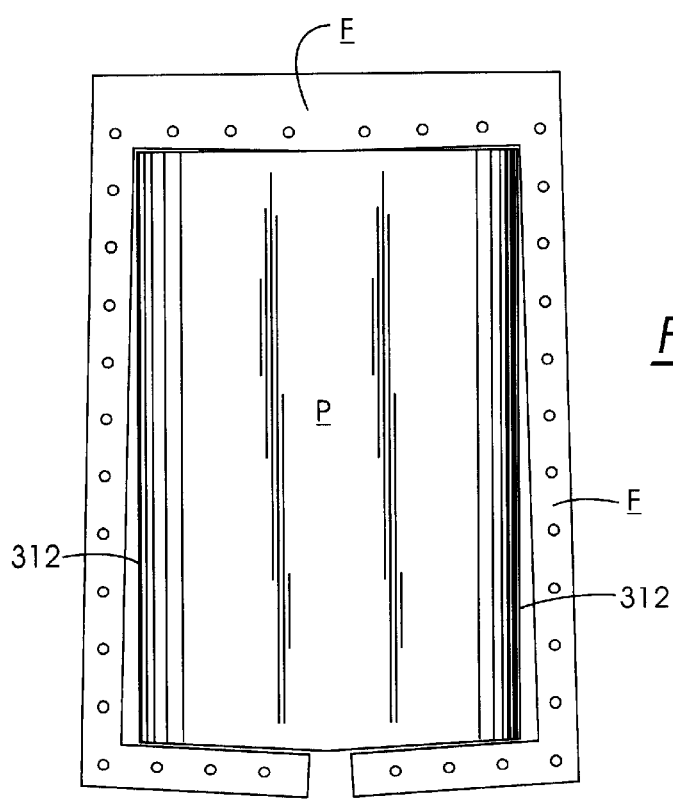
FIG. 32 is a schematic plan view of the product blow molded in the apparatus of FIGS. 25 through 29 with partially attached integral gutter flash.

The basic sequence of steps for operating blow-molding machine or system 210, including blow-mold sub-assemblies 220 and 260, for a complete machine production cycle are as follows:

1. Activate machine 210.
2. Retract platens 220 and 224 to fully-separate (open) blow-mold sub-assemblies 222 and 226 (machine function).
3. Cause heated tubular thermoplastic resin parison 240 to descend from die-head 218 to lower edges of blow-mold sub-assemblies 222 and 226 (machine function).
4. Rapid advance platens 220 and 224 sufficient to engage all crash pads 268 and 270 and thereby fully close blow-mold sub-assemblies 222 and 226 by actuating rapid traverse hydraulic actuators 228 and 230 (machine function).
5. Clamp blow-mold sub-assemblies 222 and 226 together by simultaneously activating hydraulic actuators 232, 234, 236, and 238 (machine function).
6. Insert inflation needle 286 into the descended parison contained within the product cavities 282 of mold assemblies 222 and 226.
7. Inject compressed air into contained parison through needle 286 thereby expanding heated parison thermoplastic resin contained within blow-mold assemblies into complete contact with the product cavities 282 of such blow-mold assemblies (machine function).
8. Activate bi-directional hydraulic actuators 294 and 298 to pivot gutter plate elements 290 and 291 about their respective pivot axes 296 and 300 thereby nearly fully separating gutter flash F from blow-molded product P progressively along the product mold parting line perimeter 312 by application of tension forces. See FIG. 32.
9. Reverse the actuation direction of clamping bi-directional hydraulic actuators 232, 234, 236, and 238 (machine function).
10. Reverse the actuation direction of bi-directional rapid traverse hydraulic actuators 228 and 230 to fully separate and fully open blow-mold sub-assemblies 222 and 226.
11. Reverse bi-directional hydraulic actuators 294 and 298 to return gutter plate elements 290 and 291 to their initial position.
12. Actuate product ejectors 284 to eject product P and its partially integrally attached gutter flash F from retention within blow-mold sub-assemblies 222 and 226 for removal from blow-molding machine 210.
13. Remove the product P with partially attached gutter flash F from within machine (machine function).
14. Repeat steps 3 through 13 to the end of the production run of machine 210.
15. Deactivate machine 210.

Figure 30:
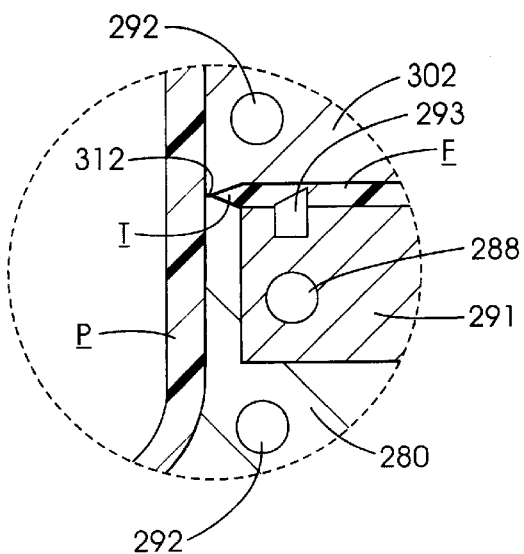
FIG. 30 is an enlarged view of a designated portion of FIG. 28.
Figure 31:
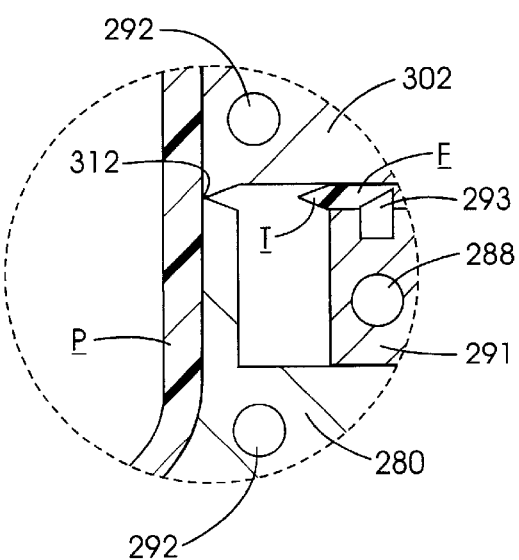
FIG. 31 is an enlarged view of a designated portion of FIG. 29.

FIG. 30 schematically illustrates the combined product P and partially attached (separated) gutter flash F that are removed from blow-molding machine 210 following each cycle of machine operation. FIG. 31 shows the gutter flash F separated from blow-molded product P.

Figure 34:
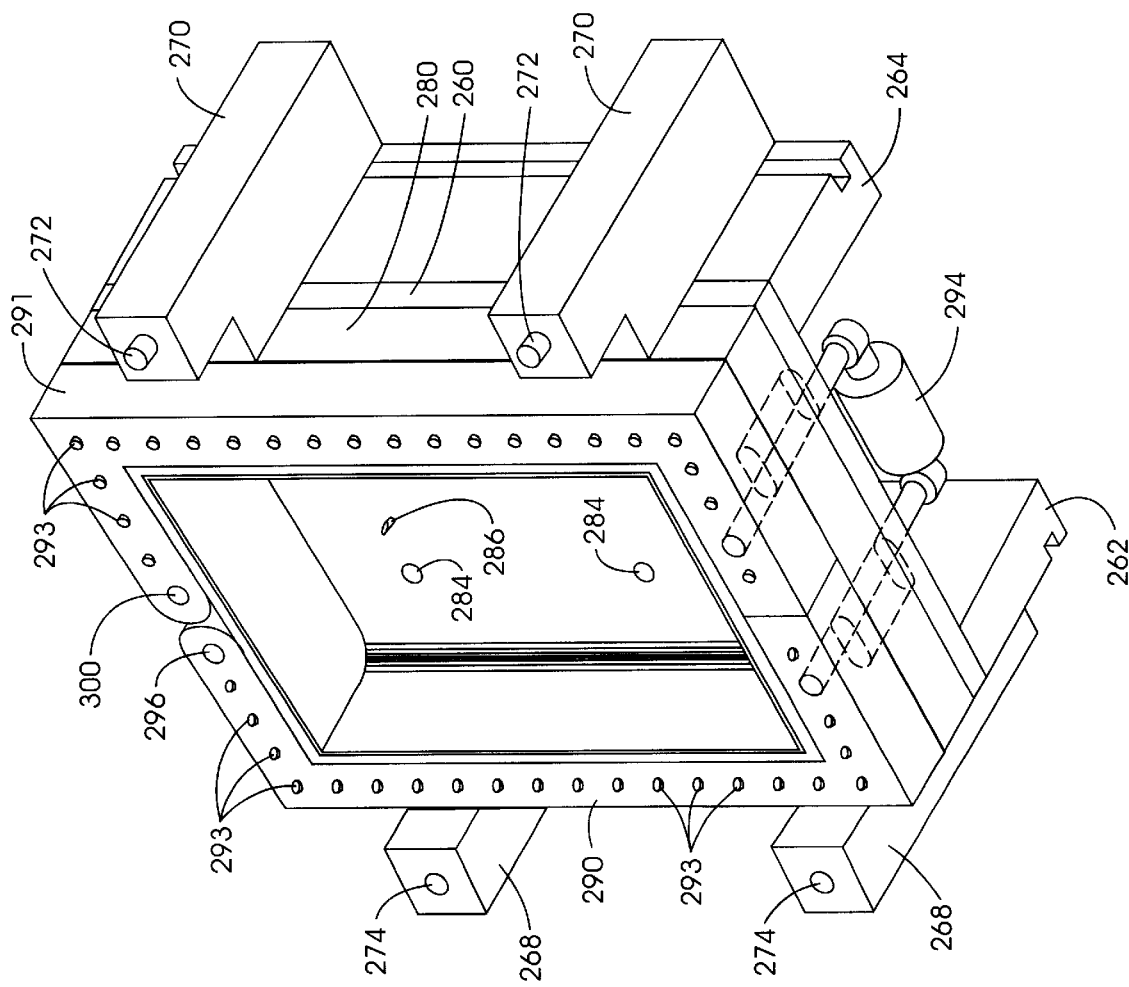
FIGS. 34 and 35 are similar to FIGS. 26 and 27, respectively, but pertaining to an alternate invention embodiment utilizing a single dual (double-piston) bi-directional actuator rather than a pair of single-piston bi-directional actuators.
Figure 35:
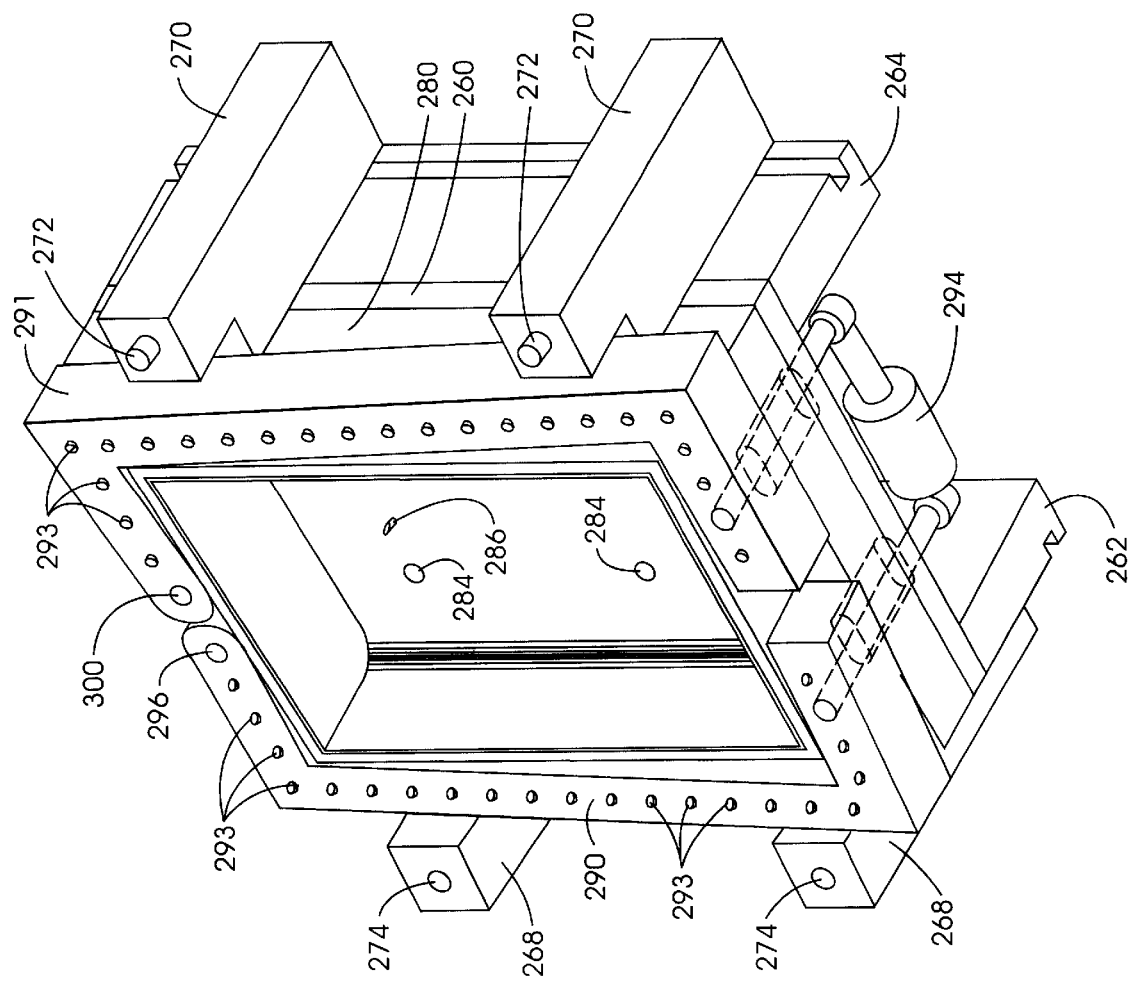

Note that since FIGS. 34 and 35 are similar to FIGS. 26 and 27 save for the fact that the FIGS. 34, 35 embodiment of blow-mold sub-assembly 222 utilizes a conventional single dual (double-piston) bi-directional actuator 294 to cause pivotal movement of gutter plates 290 and 291 rather than a pair of conventional single-piston bi-directional actuators.

Various changes may be made to the relative sizes, shapes, materials of construction, and method or procedural steps specifically detailed above and in connection with FIGS. 1 through 32 without departing from the intent, meaning, or scope of the claims which follow.

I claim as my invention:

1. In a method of producing a blow-molded thermoplastic resin product that is contained within operationally-closed co-operating blow-mold subassemblies having movable sectional gutter portions which form the product with a product mold parting line perimeter and with gutter flash integrally attached to the product at the product mold parting line perimeter, the step of progressively separating the integrally attached gutter flash from the product by moving one or more of the sectional gutter portions of the mold at the product mold parting line perimeter while restraining the product within the operationally-closed co-operating blow-mold sub-assemblies.

2. The method invention defined by claim 1, and wherein said step of separating the integrally attached gutter flash from the product is accomplished by applying tension forces to the integrally attached gutter flash which pull the gutter flash away from the product at the product mold parting line perimeter.

3. The method invention defined by claim 1, and including a cooling step wherein the operationally-closed co-operating blow-mold sub-assemblies are each conduction-cooled by a liquid coolant in blow-mold sub-assembly regions adjacent the product and in proximity to the product mold parting line perimeter prior to said step of separating the integrally attached gutter flash from the product at the product mold parting line perimeter.

4. The method invention defined by claim 3, and wherein in said cooling step the operationally-closed co-operating blow-mold sub-assemblies are also additionally conduction-cooled by a liquid coolant in blow-mold sub-assembly regions adjacent the gutter flash prior to and during said step of separating the integrally attached gutter flash from the product at the product mold parting line perimeter.

5. The method invention defined by claim 3, and wherein said cooling step utilizes a liquid coolant having a solidification temperature that is significantly lower than the solidification temperature of water.

6. The method invention defined by claim 4, and wherein said cooling step utilizes a liquid coolant having a solidification temperature that is significantly lower than the solidification temperature of water.

7. In a method of producing a blow-molded thermoplastic resin product in blow-mold apparatus having co-operating blow-mold sub-assemblies having movable sectional gutter portions which are each provided with a complementary product cavity, the steps of:

operationally-closing the blow-mold sub-assemblies with respect to each other and with a thermoplastic resin parison contained therebetween;

injecting a pressurized gas into the interior of the thermoplastic resin parison thereby forcing the thermoplastic resin prison into contact with product-defining surfaces of the blow-mold sub-assembly complementary product mold cavities to thereby form a blow-molded thermoplastic resin product having a product mold parting line perimeter and having a gutter flash integrally attached to the product at said product mold parting line perimeter;

separating said integrally attached gutter flash from the blow-molded thermoplastic resin product progressively by moving one or more of the gutter sectional portions of the mold at the said product mold parting line perimeter while said product is restrained within said operationally-closed blow-mold sub-assemblies; and opening said operationally-closed blow-mold sub-assemblies; with respect to each other and effecting sequential removal of the product and of the separated gutter flash from the blow-molding apparatus and blow-mold sub-assemblies, said integrally attached gutter flash being separated from said blow-molded thermoplastic resin product progressively along the product mold parting line perimeter by the application of tension forces to said integrally attached gutter flash at gutter flash regions adjacent said formed blow-molded products mold parting line perimeter.

8. In a method of producing a blow-molded thermoplastic resin product in co-operating base and cap blow-mold sub-assemblies which each have a product mold and a relatively movable gutter plate that surrounds the product mold, the step sequence of:

operationally closing the co-operating the base and cap blow-mold sub-assemblies with their product molds in fixed positions relative to each other and with a thermoplastic resin parison captured between the base and cap blow-mold sub-assemblies;

injecting pressurized gas into the interior of the thermoplastic resin parison without causing movement of the base and cap blow-mold sub-assembly product molds relative to each other to thereby form a blow-molded thermoplastic resin product;

moving the base and cap blow-mold sub-assembly gutter plates relative to each other and relative to the base and cap blow-mold sub-assembly product molds to forcibly clamp portions of the thermoplastic resin parison between the gutter plates;

separating the integrally attached gutter flash from said blow-molded thermoplastic resin product progressively along the product mold parting line perimeter by causing pivoted movement of the gutter plates relative to the base and cap blow-mold subassembly product molds while the product is restrained within the operationally-closed blow-mold subassemblies;

and afterwards opening the operationally-closed blow-mold sub-assemblies with respect to each other and effecting sequential removal of the product and of the separated gutter flash from the blow-molding apparatus and blow-mold sub-assemblies.

9. In a method of producing a blow-molded thermoplastic resin product in co-operating base and cap blow-mold sub-assemblies which each have a liquid-cooled product mold and a relatively movable liquid-cooled gutter plate that surrounds the product mold, the step sequence of:

operationally closing the co-operating the base and cap blow-mold sub-assemblies with their product molds in fixed positions relative to each other and with a thermoplastic resin parison between the base and cap blow-mold sub-assemblies;

injecting pressurized gas into the interior of the thermoplastic resin prison without causing movement of the base and cap blow-mold sub-assembly product molds relative to each other to thereby form a blow-molded thermoplastic resin product;

moving the base and cap blow-mold sub-assembly liquid-cooled gutter plates relative to each other and relative to the base and cap blow-mold sub-assembly liquid-cooled product molds to forcibly clamp portions of the captured thermoplastic resin parison between the base and cap blow-mold sub-assembly liquid-cooled gutter plates and thereby form, and accelerate the cooling of portions of the clamped thermoplastic resin prison as integrally attached gutter flash;

separating the integrally attached gutter flash from said blow-molded thermoplastic resin product progressively along the product mold parting line perimeter by causing pivoted movement of the gutter plates relative to the base and cap blow-mold subassembly product molds while the product is restrained within the operationally-closed blow-mold sub-assemblies; and afterwards opening said operationally-closed blow-mold sub-assemblies with respect to each other and effecting sequential removal of the product and of the separated gutter flash from the blow-molding apparatus and blow-mold sub-assemblies.

10. In a method of producing a blow-molded thermoplastic resin product in co-operating base and cap blow-mold sub-assemblies which each have a product mold and a movable gutter plate surrounding the product mold, and which each function to form the blow-molded thermoplastic resin product with a blow-mold parting line perimeter, with a gutter flash tapered transition tab integrally attached to the blow-molded product along the product blow-mold parting line perimeter, and with non-tapered gutter flash integrally attached to the gutter flash tapered transition tab, the steps of:

operationally closing the co-operating the base and cap blow-mold sub-assemblies in fixed positions relative to each other and with a thermoplastic resin parison captured between the base and cap blow-mold sub-assemblies;

injecting pressurized gas into the interior of the thermoplastic resin parison to thereby form the blow-molded thermoplastic resin product with an integrally attached gutter flash tapered transition tab;

moving the base and cap blow-mold sub-assembly gutter plates relative to each other to forcibly clamp portions of the captured thermoplastic resin parison between the base and cap blow-mold sub-assembly gutter plates to thereby form, and accelerate the cooling of, portions of the clamped thermoplastic resin parison into integrally attached non-tapered gutter flash;

separating the gutter flash tapered transition tab and integrally attached gutter flash from the blow-molded thermoplastic resin product progressively along the product mold parting line perimeter and moving the separated gutter flash transition tab and integrally attached gutter flash into frictional engagement with the exterior wall of the cap blow-mold sub-assembly product mold by causing pivoted movement of the gutter plates relative to the base and cap blow-mold subassembly product molds while the product is restrained within the operationally-closed blow-mold sub-assemblies and to thereby; and, afterwards opening the operationally-closed blow-mold sub-assemblies with respect to each other and effecting sequential removal of the product and of the separated gutter flash transition tab and integrally attached gutter flash from the blow-mold sub-assemblies.

* * * * *